(12) United States Patent
Menichetti

(10) Patent No.: US 6,865,873 B2
(45) Date of Patent: Mar. 15, 2005

(54) PULL TYPE V-SHAPED HAY RAKE

(75) Inventor: Silvano Menichetti, Umbertide (IT)

(73) Assignee: SITREX S.r.l., Perugia (IT)

( * ) Notice: Subject to any disclaimer, the term of this patent is extended or adjusted under 35 U.S.C. 154(b) by 0 days.

(21) Appl. No.: 10/177,303

(22) Filed: Jun. 21, 2002

(65) Prior Publication Data

US 2003/0233820 A1 Dec. 25, 2003

(51) Int. Cl.⁷ ................. A01D 76/00; A01D 78/00; A01D 80/00; A01D 84/00
(52) U.S. Cl. ....................................... 56/367
(58) Field of Search ................ 56/367, 370, 365, 56/372, 380, 381, 384, 385, 296, 397, 377; 172/776, 311, 501

(56) References Cited

U.S. PATENT DOCUMENTS

| | | |
|---|---|---|
| 3,208,536 A | 9/1965 | Orendorff |
| 3,484,803 A | 12/1969 | Breed et al. |
| 3,498,387 A | 3/1970 | Roth |
| 3,814,191 A | 6/1974 | Tilbury |
| 3,817,405 A | 6/1974 | Neely, Jr. |
| 3,834,142 A | 9/1974 | Johnston et al. |
| 3,936,994 A | 2/1976 | Mortier et al. |
| 3,995,416 A | 12/1976 | van der Lely |
| 4,011,914 A | 3/1977 | Elmer |
| 4,034,623 A | 7/1977 | Boone et al. |
| 4,043,099 A | 8/1977 | Cheatum |
| 4,049,062 A | 9/1977 | Rossmiller et al. |
| 4,058,958 A | 11/1977 | Sadler et al. |
| 4,077,189 A | 3/1978 | Hering |
| 4,171,726 A | 10/1979 | Ward |
| 4,172,537 A | 10/1979 | Gandrud et al. |
| 4,183,198 A | 1/1980 | Sligter |
| 4,194,348 A | 3/1980 | Gerlinger |
| 4,198,805 A | 4/1980 | Gerlinger |

(List continued on next page.)

FOREIGN PATENT DOCUMENTS

| | | |
|---|---|---|
| DE | 2406702 | 2/1974 |
| DE | 2455660 | 7/1975 |
| DE | 2414098 | 10/1975 |
| DE | 2818359 | 11/1979 |
| GB | 2017476 | 10/1979 |

OTHER PUBLICATIONS

Hodg–Bilt, Product data for "Hay Rake Carrier", no date.
Sitrex, Operator's and Service Parts Manual, no date.
Vicar, Product data for "Crop–Driven Fingerwheel Rakes", no date.

(List continued on next page.)

*Primary Examiner*—Árpád Fábián Kovács
(74) *Attorney, Agent, or Firm*—Kenyon & Kenyon

(57) ABSTRACT

A hay rake includes a crosswise member having a right section and a left section. A first rake arm has a front end and a back end, the first rake arm being pivotably mounted at its back end to the right section of the crosswise member so as to be moveable between an open position and a closed position. A second rake arm has a front end and a back end, the second rake arm being pivotably mounted at its back end to the left section of the crosswise member so as to be moveable between an open position and a closed position. A plurality of rotatable rake wheels are mounted on each of the first and second rake arms. The hay rake also includes first and a second actuators. The first actuator has a first section connected to the right section of the crosswise member and a second section connected to the first rake arm. The second actuator has a first section connected to the left section of the crosswise member and a second section connected to the second rake arm. Each actuator operates to move the rake arm to which it is connected between the open position and the closed position.

6 Claims, 23 Drawing Sheets

U.S. PATENT DOCUMENTS

| | | | |
|---|---|---|---|
| 4,202,160 A | 5/1980 | van der Lely | |
| 4,203,277 A | 5/1980 | Kaetzel | |
| 4,214,428 A | 7/1980 | Caraway | |
| 4,218,867 A | 8/1980 | Kaetzel | |
| 4,245,457 A | 1/1981 | Gerlinger | |
| 4,245,458 A | 1/1981 | Smith | |
| 4,248,260 A | 2/1981 | Addison et al. | |
| 4,254,609 A | 3/1981 | van der Lely | |
| 4,274,249 A | 6/1981 | Hauser | |
| 4,275,551 A | 6/1981 | van der Lely | |
| 4,275,552 A | 6/1981 | DeCoene | |
| 4,292,793 A | 10/1981 | Hauser | |
| 4,352,268 A | 10/1982 | van der Lely et al. | |
| 4,366,867 A | 1/1983 | Filbrun | |
| 4,367,622 A | 1/1983 | Aron et al. | |
| 4,370,846 A | 2/1983 | Arnold | |
| 4,395,868 A | 8/1983 | Kaetzel | |
| 4,397,135 A | 8/1983 | Wattron | |
| 4,457,127 A | 7/1984 | Maier et al. | |
| 4,529,040 A | 7/1985 | Grollimund | |
| 4,555,897 A | 12/1985 | Degelman | |
| 4,615,397 A * | 10/1986 | Hastings | 172/776 |
| 4,621,487 A | 11/1986 | Urlacher et al. | |
| 4,622,806 A | 11/1986 | Bahnman et al. | |
| 4,641,491 A | 2/1987 | van der Lely et al. | |
| 4,682,462 A | 7/1987 | Johnson, Sr. | |
| 4,685,282 A | 8/1987 | Allen | |
| 4,723,401 A | 2/1988 | Webster et al. | |
| 4,723,402 A | 2/1988 | Webster et al. | |
| 4,723,403 A | 2/1988 | Webster | |
| 4,723,404 A | 2/1988 | Aron | |
| 4,753,063 A | 6/1988 | Buck | |
| D298,139 S | 10/1988 | van Staveren | |
| 4,776,157 A | 10/1988 | van der Lely et al. | |
| 4,785,614 A | 11/1988 | Schoenherr | |
| D299,652 S | 1/1989 | Taylor | |
| D299,721 S | 2/1989 | Webster et al. | |
| 4,864,809 A | 9/1989 | van der Lely et al. | |
| 4,875,332 A | 10/1989 | Aron | |
| 4,885,991 A | 12/1989 | Borba | |
| 4,914,901 A | 4/1990 | Aron | |
| 4,920,735 A | 5/1990 | Bailey et al. | |
| 4,922,699 A | 5/1990 | Gantzer | |
| 4,926,619 A | 5/1990 | Ungruh et al. | |
| 4,932,197 A | 6/1990 | Allen | |
| 4,947,631 A | 8/1990 | Kuehn | |
| 4,974,407 A | 12/1990 | Rowe et al. | |
| 4,977,734 A | 12/1990 | Rowe et al. | |
| 4,996,833 A | 3/1991 | von Allowerden | |
| 5,062,260 A | 11/1991 | Tonutti | |
| 5,065,570 A | 11/1991 | Kuehn | |
| 5,127,216 A | 7/1992 | Kelderman | |
| 5,149,245 A | 9/1992 | Landmann | |
| 5,155,986 A | 10/1992 | Kelderman | |
| 5,163,277 A | 11/1992 | Fransgaard | |
| 5,199,252 A | 4/1993 | Peeters | |
| 5,231,829 A | 8/1993 | Tonutti | |
| 5,251,431 A | 10/1993 | Shoop | |
| 5,263,306 A | 11/1993 | Tonutti | |
| 5,305,590 A | 4/1994 | Peeters | |
| 5,313,772 A | 5/1994 | Tonutti | |
| 5,337,546 A | 8/1994 | Sieling | |
| 5,377,482 A | 1/1995 | Knigge | |
| 5,404,702 A | 4/1995 | Lewis | |
| 5,479,768 A | 1/1996 | Hettich | |
| 5,493,853 A | 2/1996 | Tonutti | |
| 5,502,959 A | 4/1996 | Hansen | |
| 5,540,040 A | 7/1996 | Peeters | |
| 5,546,739 A | 8/1996 | Hettich | |
| 5,557,859 A | 9/1996 | Baron | |
| 5,586,421 A | 12/1996 | Aron | |
| 5,598,691 A | 2/1997 | Peeters | |
| 5,615,545 A | 4/1997 | Menichetti | |
| 5,685,135 A | 11/1997 | Menichetti | |
| 5,685,136 A | 11/1997 | Aron | |
| 5,791,133 A | 8/1998 | Krone et al. | |
| 6,109,012 A * | 8/2000 | Staal et al. | 56/367 |
| 6,272,826 B1 | 8/2001 | Menichetti | |

OTHER PUBLICATIONS

H&S Manufacturing Product data for "Wheel Rake" and "Bi–Fold Wheel Rake" (Jan. 2, 1992).
H&S Manufacturing, Product data for "Wheel Rake" and "Bi–Fold Wheel Rake" (10/89).
Italmacchine, Product data, no date.
Taege, Product data for "Multi Purpose Vee Rakes", no date.
Read, Product data for "Multi–Rake", no date.
Tonutti s.p.a., Product data for "Rotary Rakes", no date.
Kuhn, Product data for "GA Gyrorakes", no date.
M&W SR320P Rotary Hay Rake (product data), no date.

\* cited by examiner

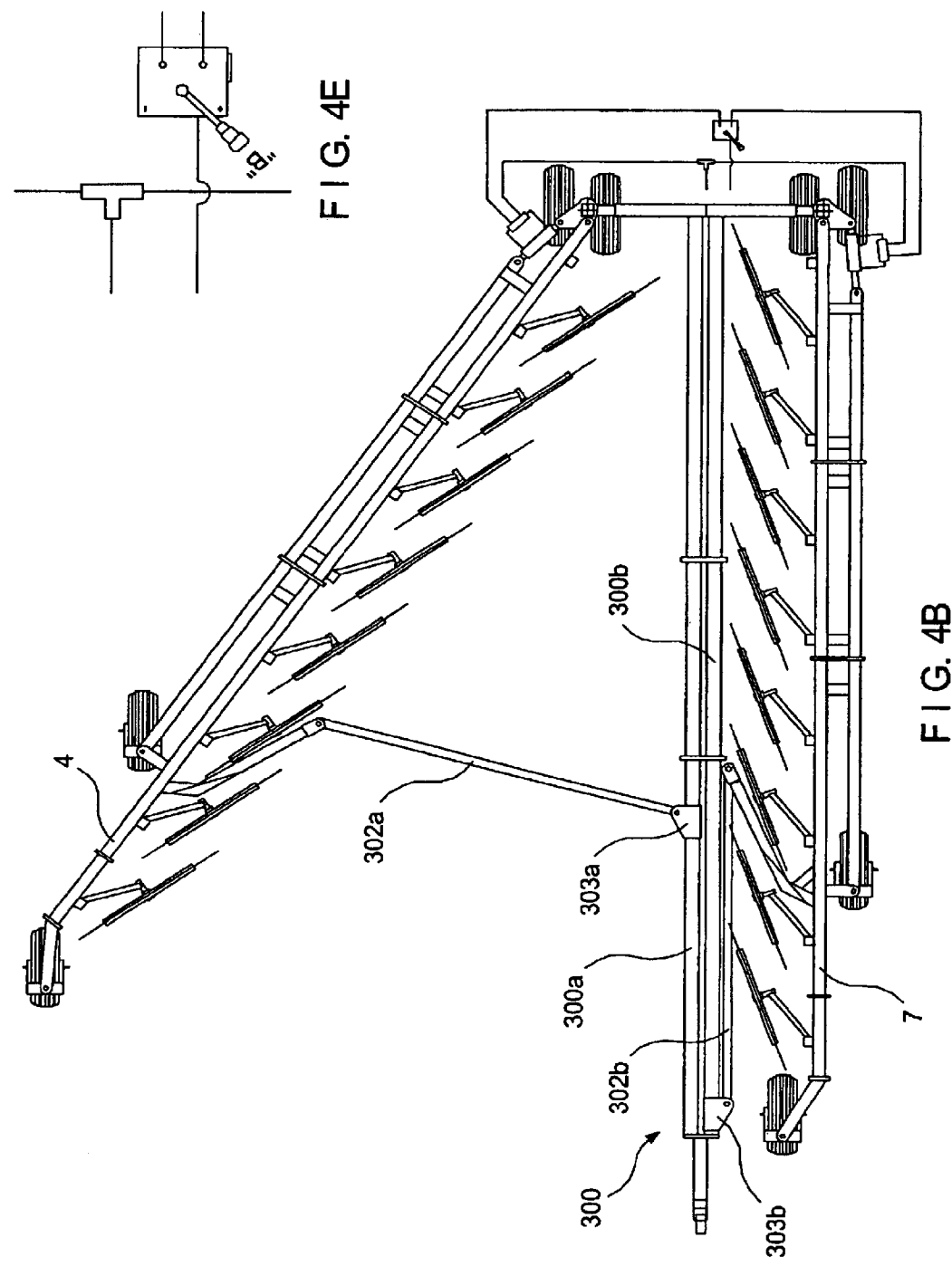

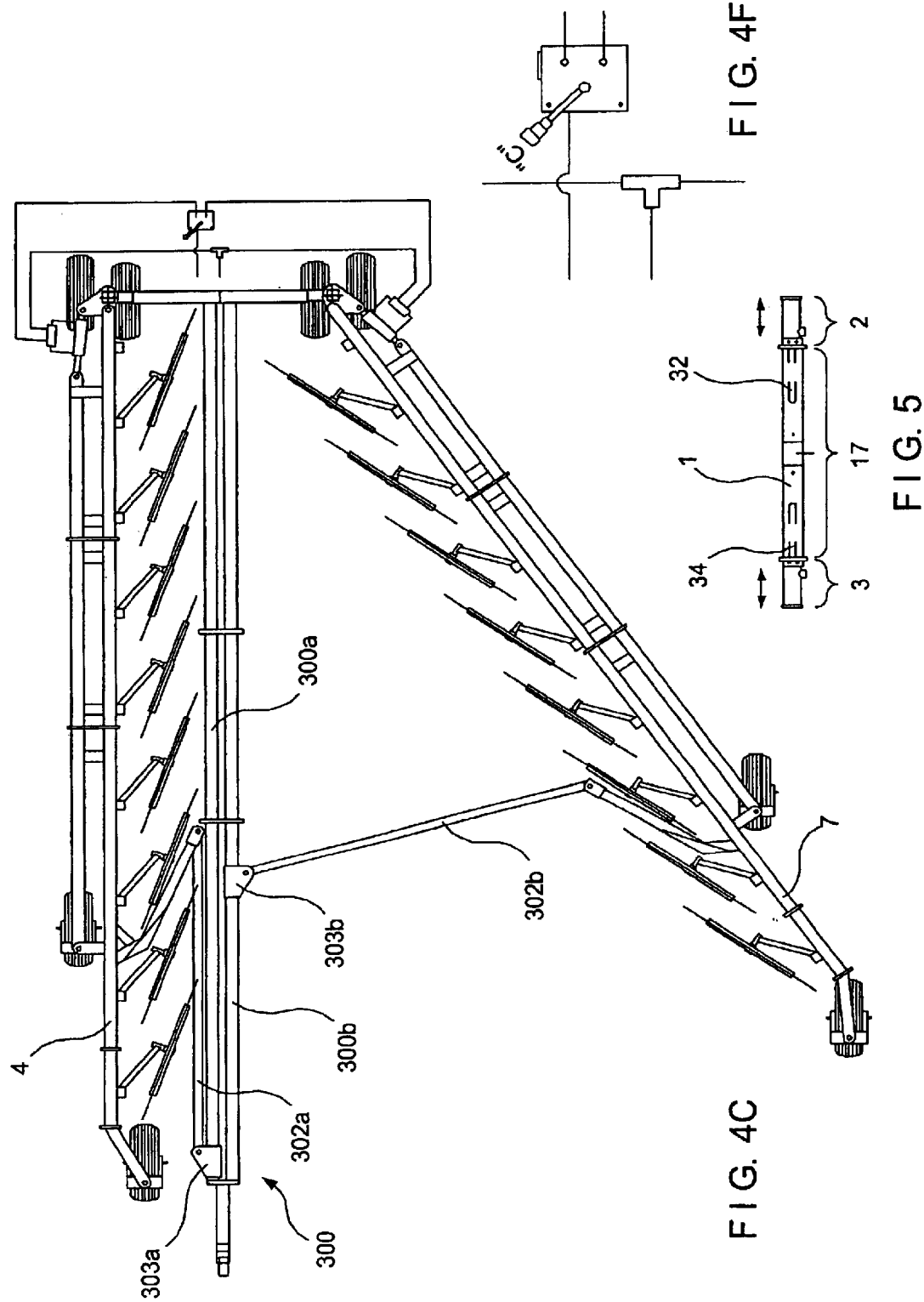

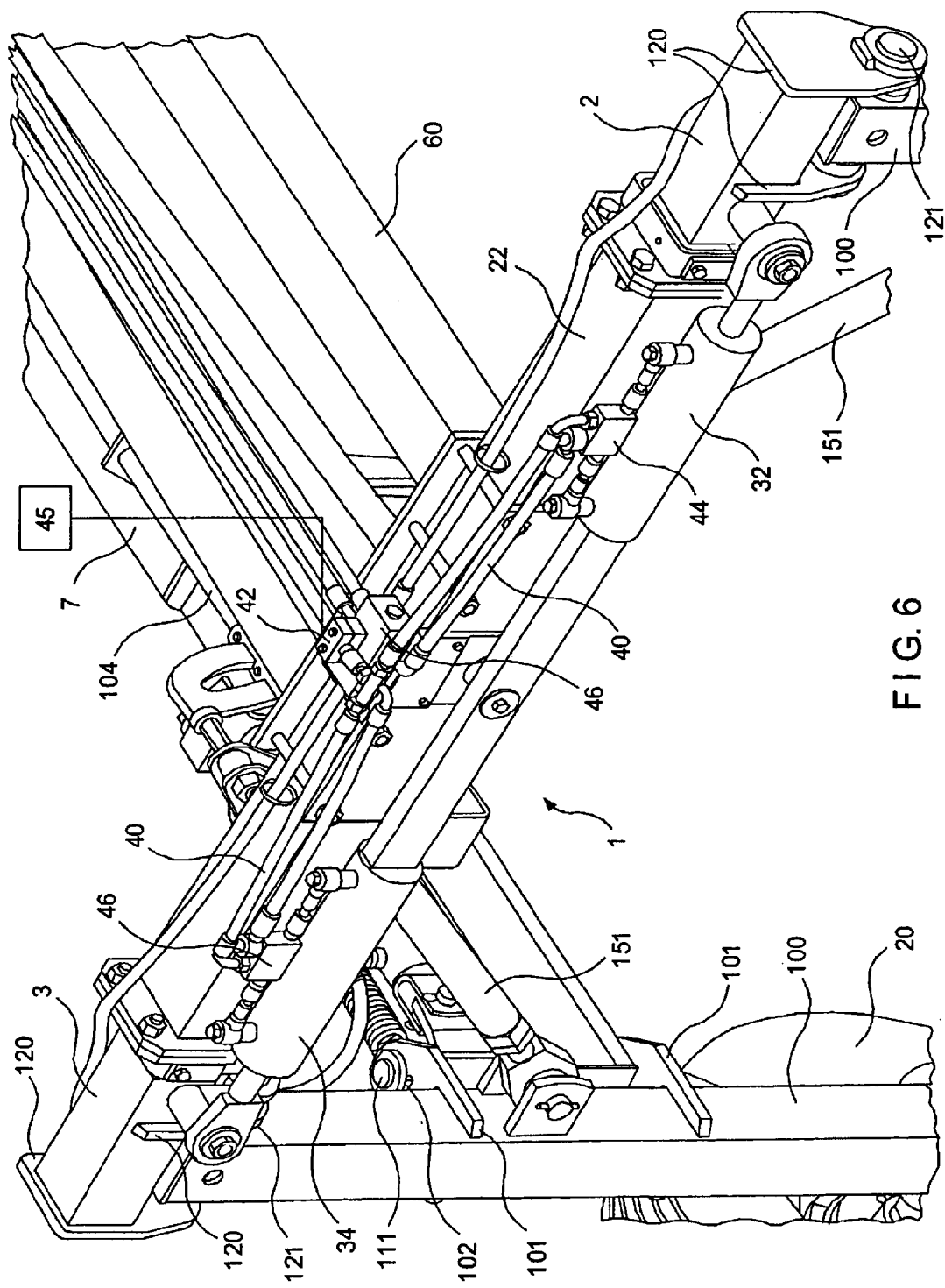

PULL TYPE V-SHAPED HAY RAKE

CROSS-REFERENCE TO RELATED APPLICATIONS

The present application incorporates herein each of the following references as fully as if set forth in their entirety: U.S. patent application Ser. No. 09/094,074, filed on Jun. 9, 1998, which issued as U.S. Pat. No. 6,000,207 on Dec. 14, 1999; and U.S. patent application Ser. No. 08/594,615, filed on Feb. 2, 1996, which issued as U.S. Pat. No. 5,685,135 on Nov. 11, 1997.

BACKGROUND OF THE INVENTION

1. Field of the Invention

The present invention relates to a collapsible pull type V-shaped rake for gathering hay.

2. Background Art

Collapsible V-shaped pull type hay rakes having two movable arms which carry multiple rake wheels and are hinged to a wheeled cross bar, rather than a main frame, are known. A common characteristic of these rakes is that the movable hinged arms, which carry the rake wheels, can assume different positions. In particular, the arms can open to a "V" shape when the rake is in the working position, and move closer together or become entirely closed for purposes of maneuvering, transportation and storage. The opening and closing motion of the arms is generally accomplished manually, or, automatically, through a hydraulic cylinder. In some instances the hay maker arms can be operated independently of one another, to give even more flexibility to the operation of the machine. U.S. Pat. No. 5,685,135, for example, discloses a collapsible V-shaped pull-type hay rake in which each rake arm is opened or closed by the action of an individual hydraulic cylinder which acts directly on it and is attached at one end to the rake arm and at the other end to the central tow bar of the hay rake. While this mechanism is efficient with respect to opening and closing of the rake arms, it requires that the hydraulic cylinders have sufficient operating range to ensure a sufficient opening of the rake arms. The hydraulic cylinders that are available having such an operating range are costly, very heavy, delicate and usually need constant maintenance. Furthermore, this type of rake necessarily requires the presence of a sturdy central tow bar.

SUMMARY OF THE INVENTION

The present invention is a "V" shaped towable hay rake having a crosswise member and two rake arms, one mounted to the left end, and the other mounted to the right end of the crosswise member so as to be moveable between an open position and a closed position, where the rake arms are maneuvered between the open and closed position by the action of two actuators, preferably double-acting hydraulic cylinders, one connected at one end to the right rake arm and at the other end to the crosswise member, and the other connected at one end to the left rake arm and at the other end to the crosswise member.

This feature allows for the use of relatively small and compact actuators. It also allows for a very simple opening and closing mechanism for the rake arms having a minimized number of moving parts and joints. In addition, due to the position of the actuators near the crosswise member, and the arrangement of the actuators at a distance from the rake wheels mounted to the rake arms, the actuators are less prone to get dirty and are protected from mechanical harm. The connection of the actuator between the crosswise member and the rake arms also gives the hay rake a better stability and enables the hay rake to be used in a bifold rake mode, by opening both arms, or in a single rake mode, by only opening one arm.

BRIEF DESCRIPTION OF THE DRAWINGS

The invention will now be described in greater detail with reference to the accompanying drawings, a brief description of which follows:

FIGS. 4A to 4F show one embodiment of a hydraulic control system which may be employed to open and close both of the hay rake arms simultaneously or individually, FIG. 5 is a top plan view of an embodiment of the crosswise member of the towable hay rake of the present invention;

FIG. 6 shows a perspective view of an embodiment of the towable hay rake of the present invention;

DETAILED DESCRIPTION OF THE INVENTION

For ease of reference the same reference numbers are used to designate the same or corresponding elements throughout the Figures.

Figure 1:
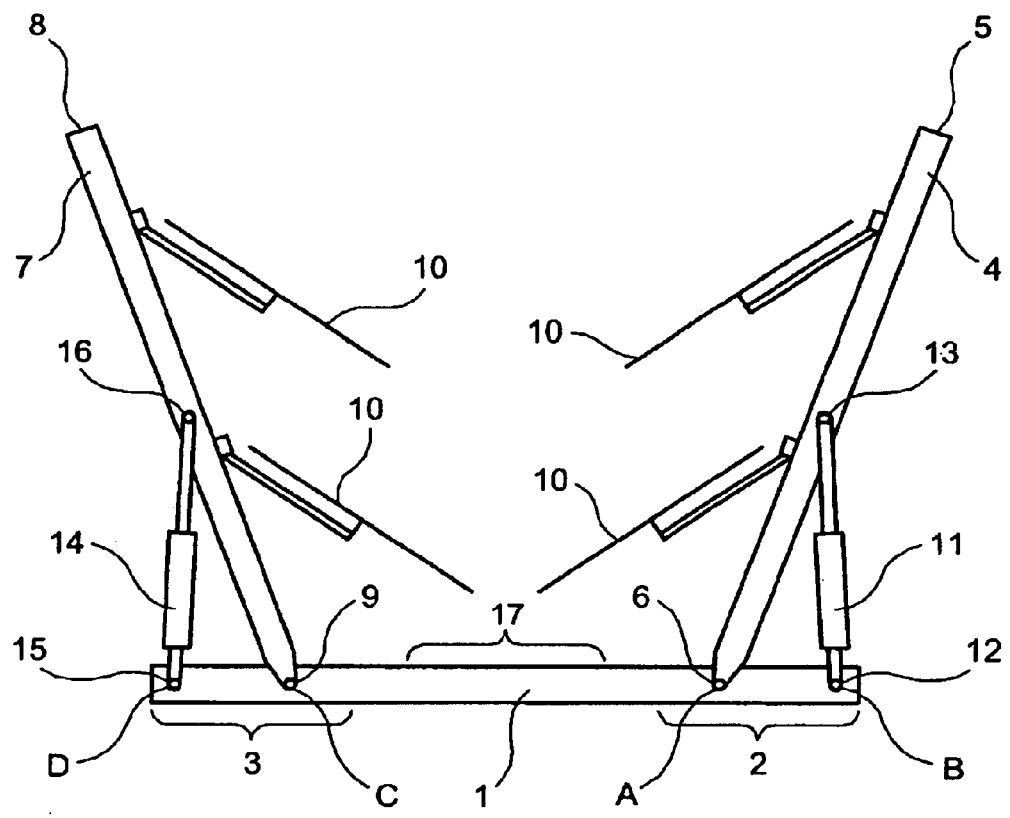
FIG. 1 is a top plan view of one embodiment of the towable hay rake of the present invention.

Referring to FIG. 1, one exemplary embodiment of the rake of the invention includes a wheeled crosswise member 1. The crosswise member 1 has a right section 2 and a left section 3. A first rake arm 4 having a front end 5 and a back end 6 is pivotably mounted at its back end 6 to the right section 2 of the crosswise member 1 so as to be moveable between an open position and a closed position. The position depicted in FIG. 1 is an intermediate position between the open position and the closed position. A second rake arm 7 having a front end 8 and a back end 9 is pivotably mounted at its back end 9 to the left section 3 of the crosswise member 1 so as to be moveable between an open position and a closed position. As with the first rake arm 4, the second rake arm 7 is depicted in FIG. 1 in an intermediate position between the closed position and the open position. A plurality of rotatable haymaker wheels 10 are mounted to each of the first and second rake arms 4 and 7. A first double acting actuator 11 has a first section 12 connected to the right section 2 of the crosswise member 1 and a second section 13 connected to the first rake arm 4. The reference character 14 designates a second double acting actuator. The second double acting actuator 14 has a first section 15 connected to the left section 3 of crosswise member 1 and a second section 16 connected to the second rake arm 7. When actuators 11 and 14 are actuated such that their respective first and second sections 12, 13 and 15, 16 are extended, the first and second rake arms 4 and 5 move from the open position depicted in FIG. 1 towards the closed position, in which the hay rake is easy to transport and maneuver. When actuators 11 and 14 are activated such that their respective first and second sections 12, 13 and 15, 16 are retracted, the rake arms 4 and 7 move toward the open position. Actuators 11 and 14 may be activated simultaneously or independently of each other. In this way rake arms 4 and 7 may be moved from the open position to the closed position and back, and to all incremental positions therebetween and back.

The arrangement of the first and second actuators 11 and 14 between right and left sections 2 and 3 of the crosswise number 1 and the respective first and second rake arms 4 and 7 advantageously allows for the use of only one actuator 11, 14 for each of the first and second rake arms 4 and 7 without any moving parts between the first and second actuators 11 and 14 and the respective first and second rake arms 4 and 7. Due to the fact that the first and second actuators 11 and 14 are directly connected to the crosswise member 1 and the first and second rake arms 4 and 7, the number of moving parts is minimized. In addition to that, only three joints are employed for each side, e.g., for each rake arm of the first and second rake arms 4 and 7. For the right side, e.g., for the first rake arm 4, there is one joint between the first rake arm 4 and the right section 2 of the crosswise member 1, there is a second joint between the first section 12 of the first actuator 11 and the right section 2 of the crosswise member 1 and there is a third joint between the second section 13 of the first actuator 11 and the first rake arm 4. The same arrangement may be employed for the left side. This allows for a simple and stable arrangement of the hay rake which is easy to manufacture and easy to maintain. Furthermore, due to the connection of the first sections 12 and 15 of the first and second actuators 11 and 14 at a greater distance from the center section 17 than the connection of the first and second rake arms 4 and 7, the first and second actuators 11 and 14 may have minimized dimensions with respect to their operating range and their power. For the purposes of clarity only, the hay rake illustrated in FIG. 1 is shown without a towbar. However, it should be understood that a towbar, various different embodiments and configurations of which are described hereinbelow, maybe employed to pull the hay rake.

Figure 2:
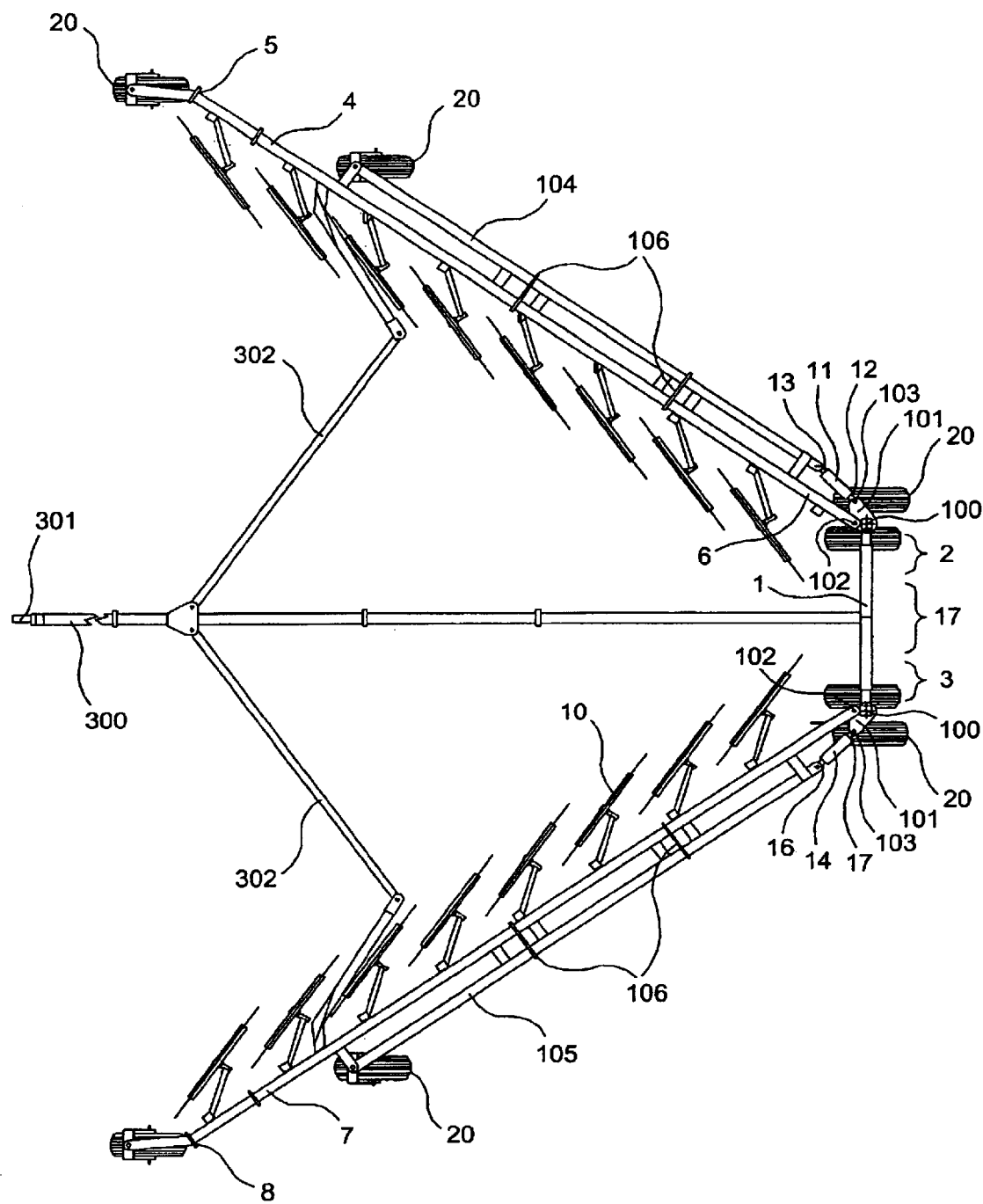
FIG. 2 shows a top plan view of another embodiment of the towable hay rake according to the present invention.

FIG. 2 shows another exemplary embodiment of the hay rake of the present invention. In FIG. 2, a towable hay rake includes a wheeled crosswise member 1 to which are connected right and left rake arms 4 and 7. Right and left sections 2 and 3 of the crosswise member 1 include right and left supports 100 to which wheels are attached. In the exemplary embodiment depicted in FIG. 2, the supports 100 are rectangular rods. Right and left triangular support plates 101 are respectively attached to the supports 100. On each of the support plates 101, there is a pivot 102. The rake arms 4 and 7 are attached to the pivots 102, so that the rake arms 4 and 7 can pivot around the pivots 102. Furthermore, each support plate 101 has another pivot 103 connected to first and second actuators 11 and 14 which are connected to push rods 104 and 105. The first and second actuators 11 and 14 deploy the rake arms 4 and 7. The pivots 103 are placed adjacent to pivots 102 on the support plate 101, but may be also placed at any location that affords sufficient leverage to move the rake arms 4 and 7. The first and second actuators 11 and 14 are preferably dual action hydraulic actuators which may be operated jointly or alone, depending on whether one or both rake arms 4 and 8 must be opened or closed.

Push rods 104 and 105 are respectively connected to the rake arms 4 and 7 by means of a plurality of attachment elements 106. A plurality of haymaker wheels 10 are attached to rake arms 4 and 7, so that they can rotate to collect the hay. Wheels 20 are attached to rake arms 4 and 7 as well as to the crosswise member 1.

As mentioned above, the actuators 11 and 14 are preferably dual action, so that they can extend and retract the component to which they are connected. In the depicted exemplary embodiment, the actuators 11 and 14 are hydraulic cylinders operated by fluid pressure However, the actuators may also be manually operable, for example by a hand crank. A connection between the crosswise member 1 and the supports 100 may be the same as shown in FIG. 6, which is discussed in greater detail below.

Figure 2A:
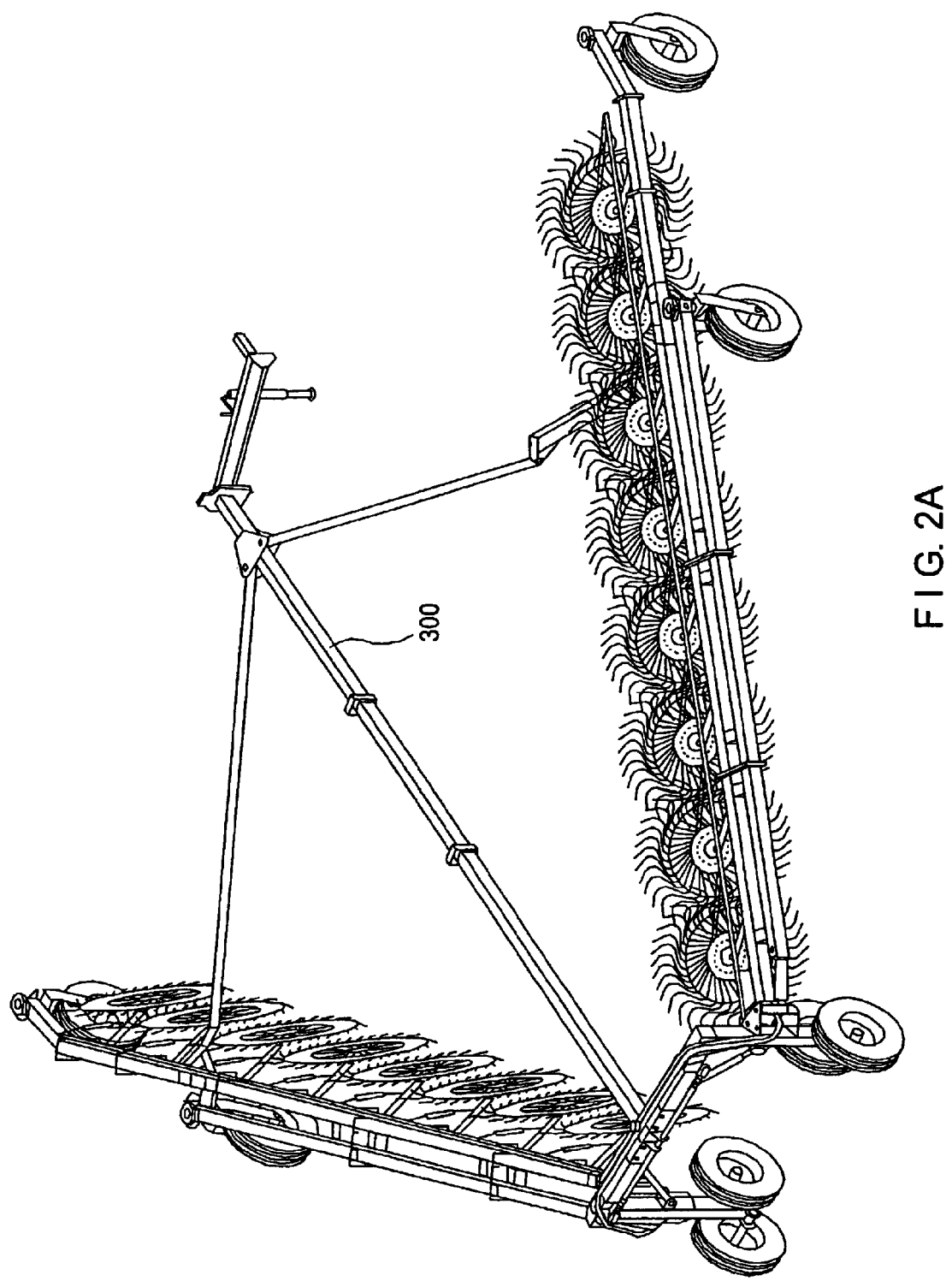
FIG. 2A shows a perspective view of another embodiment of the towable hay rake according to the present invention.

In addition, FIG. 2 illustrates one example of a towbar 300 having an eyelet 301 or other type of connection element for enabling the hay rake to be towable. Various types of towbars may be employed to tow the hay rake, some of which are described in further detail hereinbelow, and the present invention is not intended to be limited to only a single type or configuration of towbar. In the embodiment shown, towbar 300 includes a pair of stabilization elements 302 that assist in stabilizing the hay rake arms 4 and 7. Again, various types of stabilization elements may be employed to stabilize the hay rake arms 4 and 7 of the hay rake, some of which are described in further detail hereinbelow, and the present invention is not intended to be limited to only a single type or configuration of stabilization element. FIG. 2A illustrates the hay rake of FIG. 2 in the perspective view.

Figure 3:
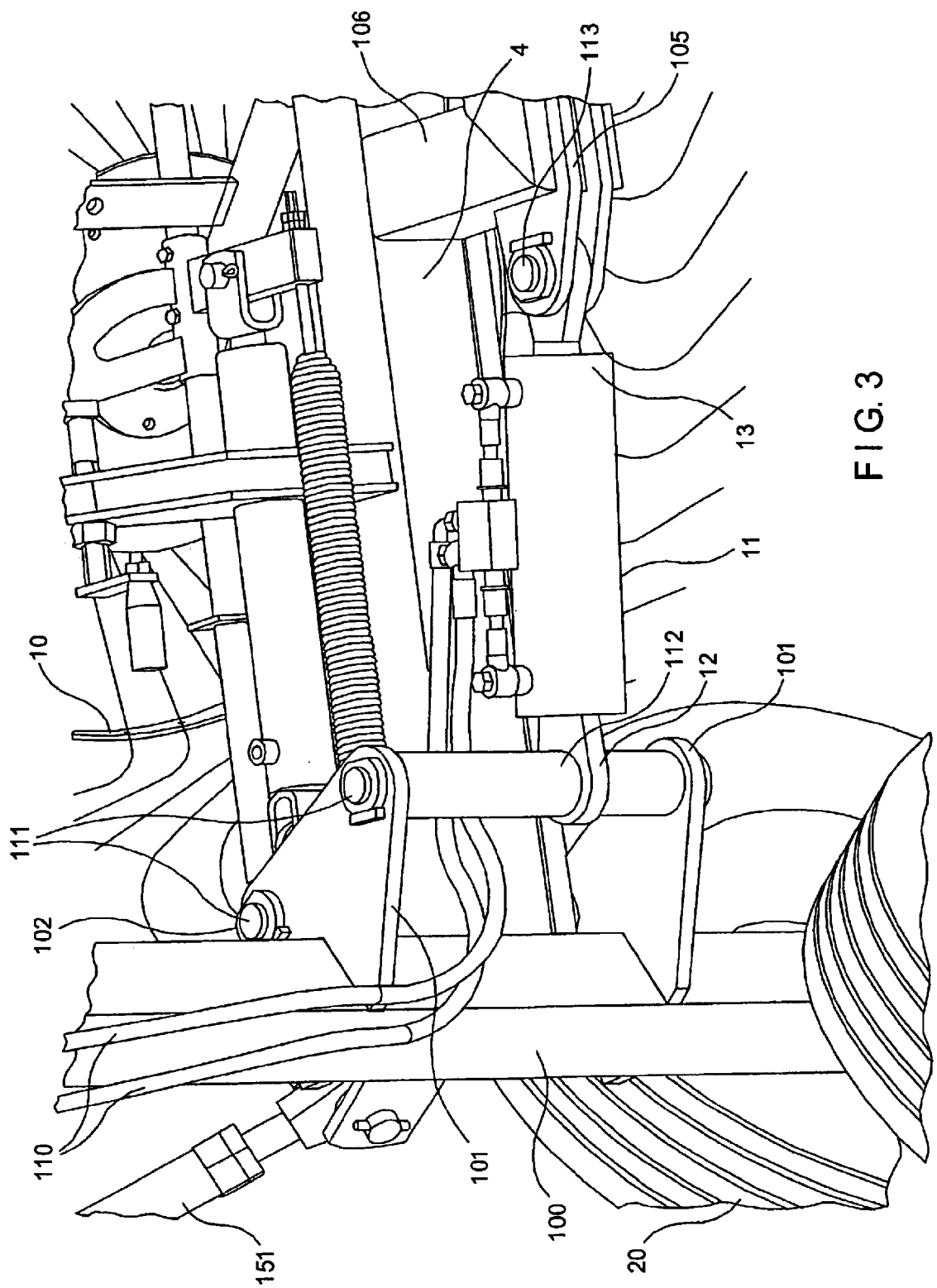
FIG. 3 shows a perspective view of a detail of the right section of the crosswise member of FIG. 2.

FIG. 3 shows a detailed view of the right section 2 of the crosswise member 1 of FIG. 2 with the support 100. In FIG. 3, two wheels 20 are attached to support 100. There are two support plates 101 (an upper support plate and a lower support plate) attached to the support 100 at a location above the wheels 20 and underneath the crosswise member 1, which is outside the view of FIG. 3. The support plates 101 are attached to the support 100, e.g., by a welding connection. The support plates 101 are attached to the support 100 such that a main plane of the support plates is parallel to the ground when the hay rake is in operation. The support plates 101 are disposed from each other at a distance such that the end 6 of the rake arm 4 (the right rake arm of the hay rake) to be connected to the right section 2 of the crosswise member 1 (to the support plate 101 and therewith to the support 100 and therewith to the crosswise member 1) fits between the two support plates 101. The rake arm 4 is attached to the support plates 101 by means of a shaft 111 which is received in openings in the upper support plate 101 and the lower support plate 101, and which sits in an opening in the rake arm 4. Pivot 102 is thus formed, allowing the rake arm 4 to rotate around the shaft 111 of the pivot 102.

At a distance from the shaft 111, there are provided further openings in the upper and lower support plates 101. In these further openings, there is provided a further shaft 112 to form the pivot 103. Attached to the shaft 112, there is the first section 12 of the first actuator 11. The second section 13 of the first actuator 11 is connected by means of a hinge 113 to the push rod 104 which is connected to the rake arm 4 by means of the attachment elements 106. As shown, e.g., in FIG. 2, a plurality of attachment elements 106 may be provided. Furthermore, there are provided hydraulic lines 110 which are connected to the first actuator 11 which is a dual action hydraulic cylinder in this exemplary embodiment.

In the exemplary embodiment shown in FIG. 3, when the first actuator 11 is actuated by providing a hydraulic fluid pressure to the first actuator 11 via the hydraulic lines 110, the right rake arm 4 is swivelled around the shaft 111 of the pivot 102. The attachments of the left and right rake arms 4 and 7 to the crosswise member 1 preferably have the same configurations.

Figure 4:
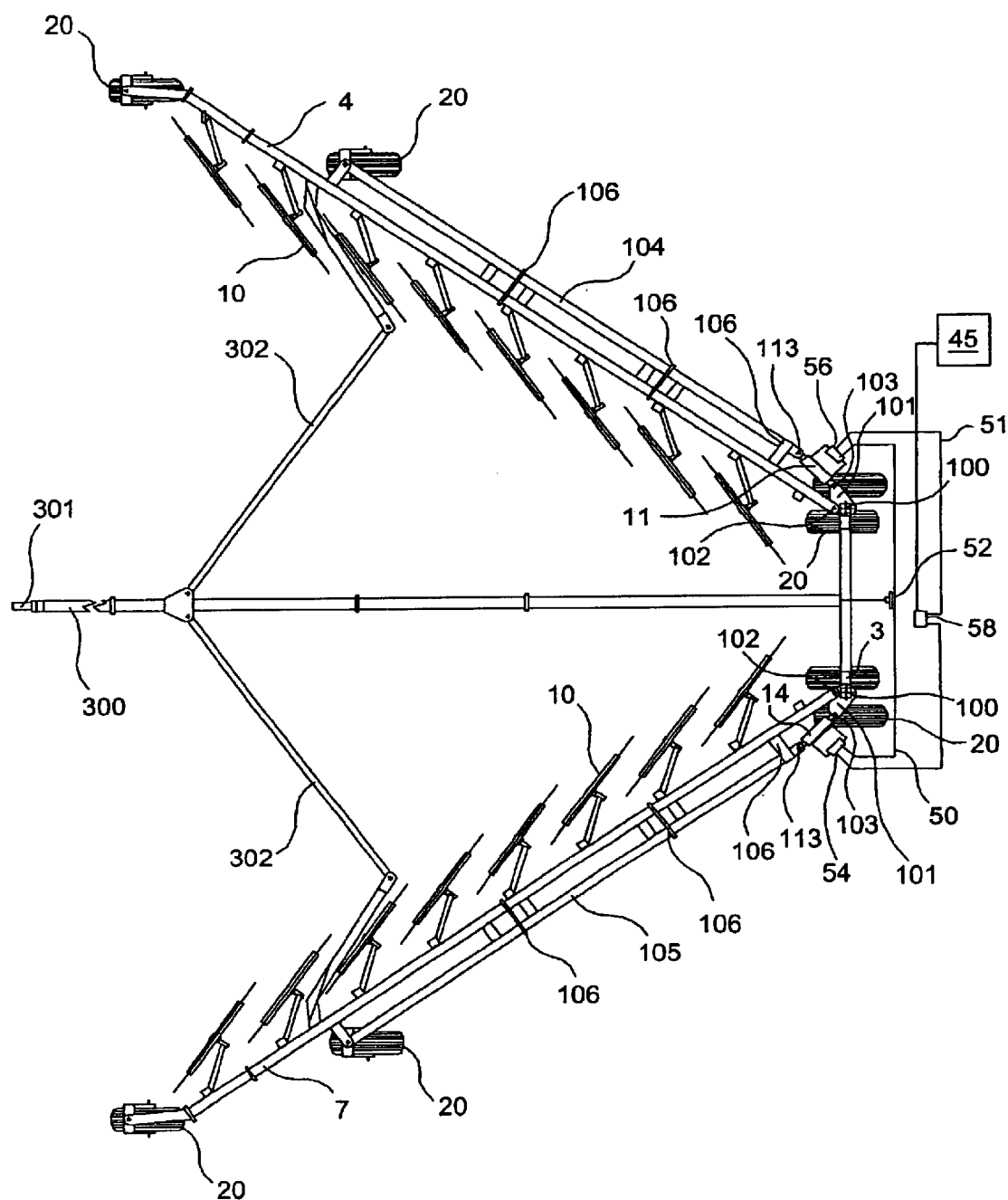
FIG. 4 shows one embodiment of a hydraulic system which may be applied in the hay rake of the present invention.

An exemplary embodiment of a hydraulic control system for first and second actuators 11 and 14 will now be described with reference to FIG. 4, which may be used in any of the embodiments described in this application. A hydraulic power divider 52 divides the hydraulic fluid flow provided via hydraulic lines 110 from a hydraulic pressure source that is not shown in FIG. 4 between first and second actuators 11 and 14. Hydraulic shutoff valves 56, 54 are connected respectively to the first and second actuators 11 and 14, and are used to shut off the flow to those actuators 11 and 14, to lock the movement of the first and second actuators 11 and 14 when pressurized hydraulic fluid is not supplied or when the pressure of the hydraulic fluid is not sufficient to effectively actuate the first and second actuators 11 and 14. In one embodiment of the present invention, hydraulic shut off valves 54, 56 are automatic. However, in an alternative of this exemplary embodiment, hydraulic shutoff valves 54, 56 are activated whenever the pressure in the hydraulic lines 51 falls below a predetermined level, or may be manually operated whenever the operator wants to lock one or both of the first and second actuators 11 and 14. Further, for example, control unit 45 may be provided to control an operation of these, or any other, valves provided in the hay rake. Again, FIG. 4 illustrates a towbar 300 having an eyelet 301 and a pair of stabilization elements, although any type of tow arrangement may be employed.

Figures 4A, 4D:
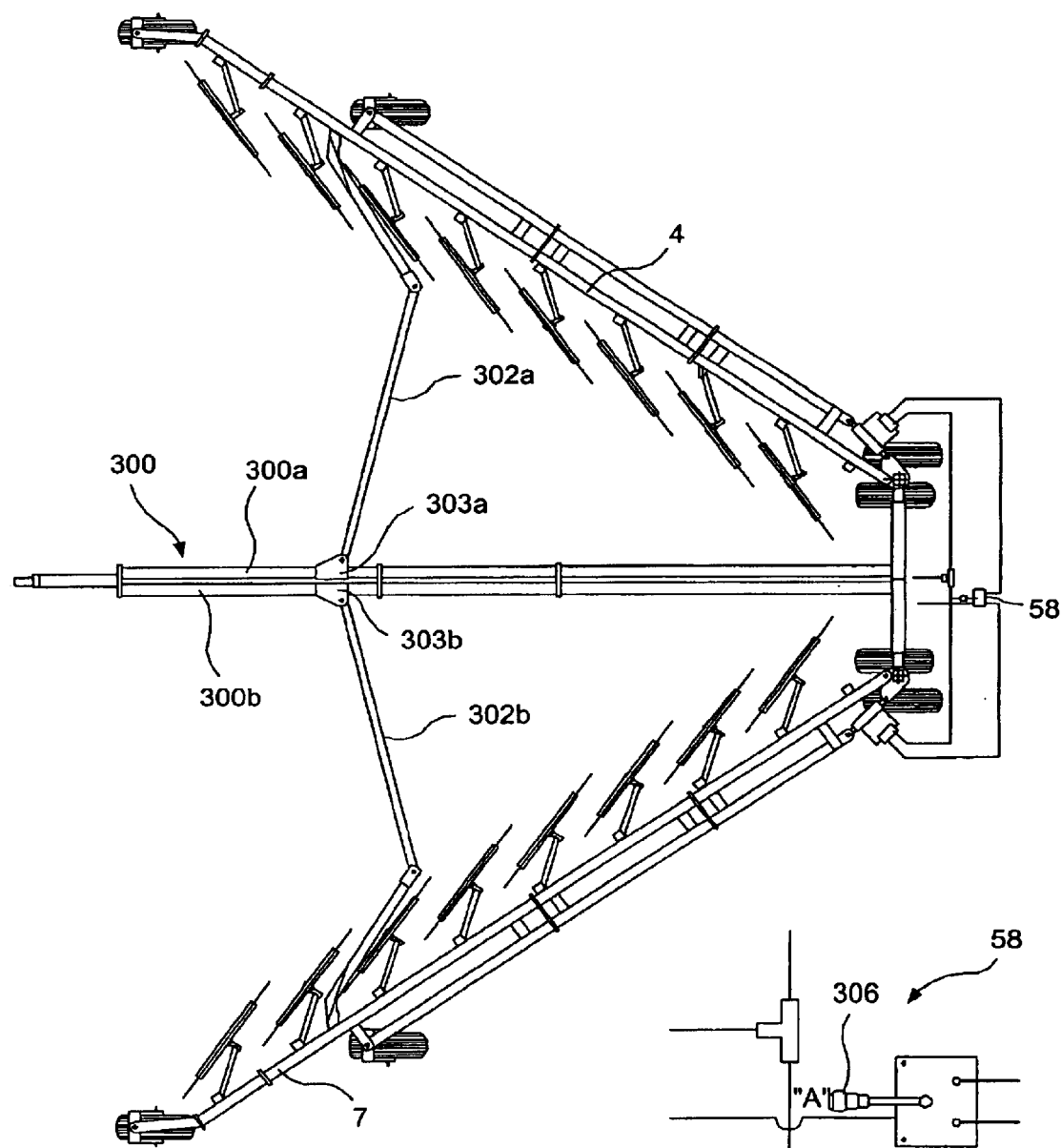

FIGS. 4A to 4E illustrate a hydraulic control arrangement that may be employed, in accordance with one embodiment of the present invention, in order to simultaneously or independently actuate the hay rake arms. It should be understood that the hydraulic control arrangement described hereinbelow may be employed to operate any type of rake having an opening mechanism that employs two hydraulic cylinders. According to this embodiment, a hydraulic controller 58 is provided that employs a hydraulic flux divider and a valve in order to selectively control the actuation of the actuators 11 and 14, and to thereby control the opening and closing of the hay rake arms 4 and 7. The hydraulic controller 58 includes a selector handle 306, which may alternatively be a switch, dial or any other type of instrument actuatable by an operator, that enables an operator to select between various, e.g., three, positions. For instance, FIG. 4D shows the hydraulic controller 58 having the selector switch in a first position labeled A. In the position labeled A, the hydraulic controller 58 is configured to actuate both hay rake arms 4 and 7 simultaneously, as is illustrated in FIG. 4A. FIG. 4A shows that, in a preferred arrangement of this embodiment, the towbar 300 includes first and second towbar rods 300*a* and 300*b*. On each of the towbar rods 300*a* and 300*b* is slideably mounted a respective connection element 303*a* and 303*b*. The connection elements 303*a* and 303*b* are rotatably coupled to first and second stabilization elements 302*a* and 302*b*, respectively. When actuated simultaneously, as illustrated in FIG. 4A, the connection elements 303*a* and 303*b* slideably travel in tandem along their respective towbar rods 300*a* and 300*b*.

FIG. 4E shows the hydraulic controller 58 having the selector switch in a second position labeled B. In the position labeled B, the hydraulic controller 58 is configured to actuate the hay rake arm 4 independently of the hay rake arm 7, as is illustrated in FIG. 4B. FIG. 4B shows that, when the hay rake arm 4 is actuated so as to assume the open position, the connection element 303*a* slideably traverses along its respective towbar rod 300*a*, while the connection element 303*b* corresponding to the hay rake arm 7, which is in the closed position, is parked at an end of its respective towbar rod 300*b*.

FIG. 4F, on the other hand, shows the hydraulic controller 58 having the selector switch in a second position labeled C. In the position labeled C, the hydraulic controller 58 is configured to actuate the hay rake arm 7 independently of the hay rake arm 4, as is illustrated in FIG. 4C. FIG. 4C shows that, when the hay rake arm 7 is actuated so as to assume the open position, the connection element 303*b* slideably traverses along its respective towbar rod 300*b*, while the connection element 303*a* corresponding to the hay rake arm 4, which is in the closed position, is parked at an end of its respective towbar rod 300*a*.

FIG. 5 shows an exemplary embodiment of the crosswise member 1 that may be used in any exemplary embodiment of the invention described in this application. In FIG. 5, the right and left sections 2 and 3 of the crosswise member 1 can telescope in and out of the center section 17 of crosswise member 1. Third and fourth dual action actuators 32, 34 respectively operate right and left sections 2 and 3, to extend and retract them thus changing the track of the towed hay rake. Each of the right and left sections 2 and 3 can be extended alone or together with the other one of the right and left sections 2 and 3, depending on the required configuration of the hay rake.

FIG. 6 shows another exemplary embodiment of the hay rake of the invention including a hydraulic power divider mechanism to divide hydraulic flow (provided by a pressure source which is not shown in FIG. 6) between the third and fourth actuators 32 and 34, which are hydraulic actuators in this exemplary embodiment, and further shows the connection of the crosswise member to the supports 100. The supports 100 are respectively connected to the right and left sections 2 and 3 of the crosswise member 1 by means of appendages 120 respectively provided at the right and left sections 2, 3, and bolts 121 slide through openings in the appendages 120 and the supports 100.

Figure 7:
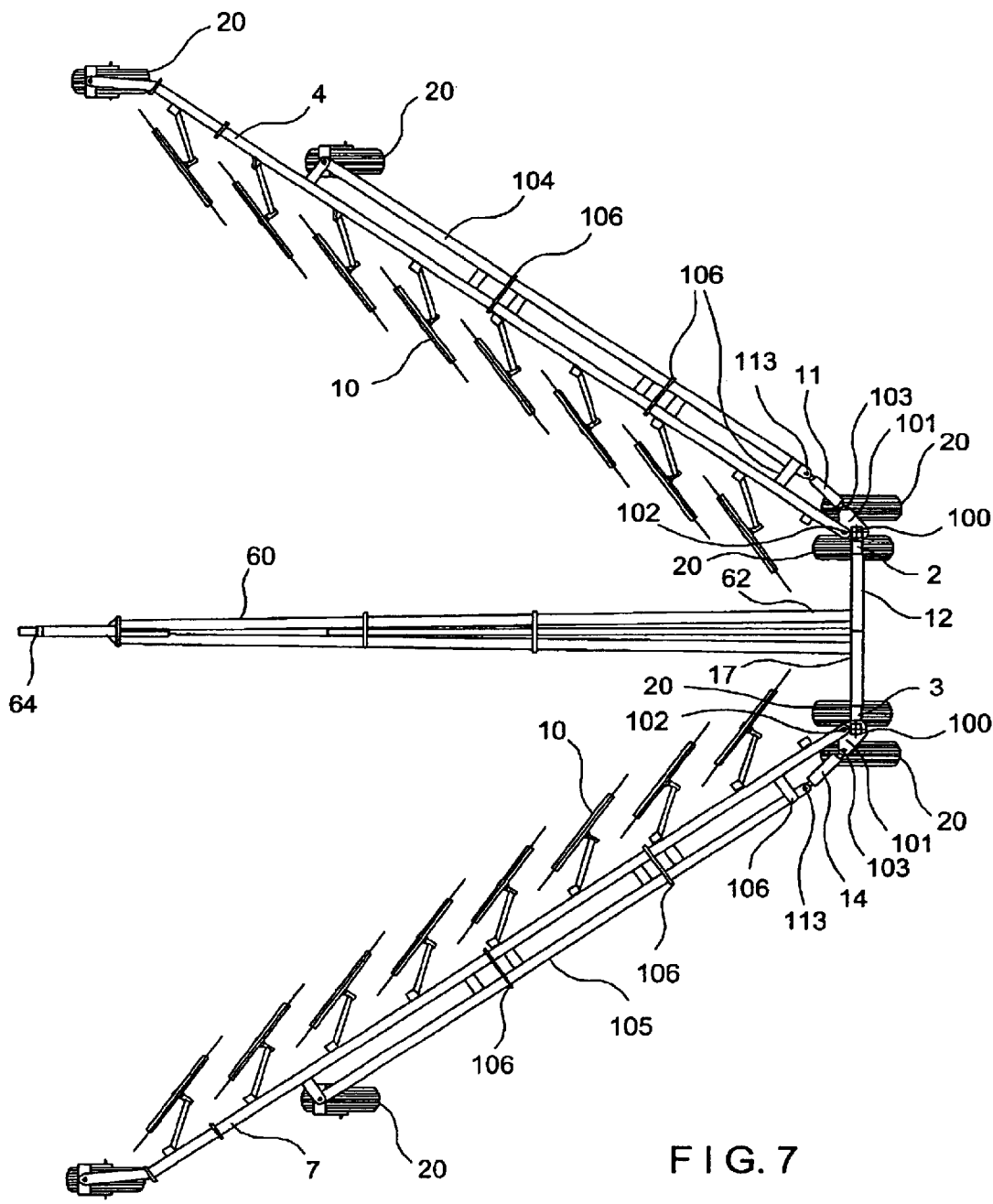
FIG. 7 shows a plan view of another embodiment of the towable hay rake of the present invention.

In FIG. 6, there is further provided a power divider valve 42 that is operated by control unit 45. The power divider valve 42 divides the flow between the third and fourth actuators 32, 34. In this exemplary embodiment, the third and fourth actuators 32, 34 are placed adjacent to the crosswise member 1, however, they could be placed in other suitable position. For example, the third and fourth actuators 32, 34 could be placed inside hollow parts of the crosswise member 1. Power divider valve 42 is used to control whether one or both of third and fourth actuators 32, 34 are operated, and whether they are extended or retracted. Hydraulic shutoff valves 44, 46 are associated with the third and fourth actuators 32, 34, and are used to block movement of the corresponding actuator of the third and fourth actuators 32, 34 when pressurized fluid is not provided. This prevents unwanted movement of the right and left sections 2 and 3 of the crosswise member 1. According to one embodiment of the present invention, the hydraulic shutoff valves 44, 46 are automatic. However, in alternatives of this exemplary embodiment, the hydraulic shutoff valves 44, 46 may be operated automatically when the pressure in hydraulic lines 40 is low, when there is no pressure provided, or may be operated by the control unit 45 in response to preselected conditions. In a further alternative of this exemplary embodiment, shutoff valves 44, 46 are manually operated, to manually prevent extension and retraction of the right and left sections 2 and 3. A set of control valves 46, each associated with one of the third and fourth actuators 32, 34, is provided to ensure synchronous and symmetric movement of the third and fourth actuators 32, 34, when such movement is required FIG. 7 shows a further exemplary embodiment of the hay rake according to the present invention. The hay rake shown in FIG. 7 is essentially similar to the hay rake shown in FIG. 2, except that there is provided a longitudinal towing arm 60. The towing arm 60 has one end 62 attached to the center section 17 of crosswise member 1, and another end 64 with appropriate connections such as a towing eyelet to be attached to a towing vehicle such as a tractor.

Figure 8:
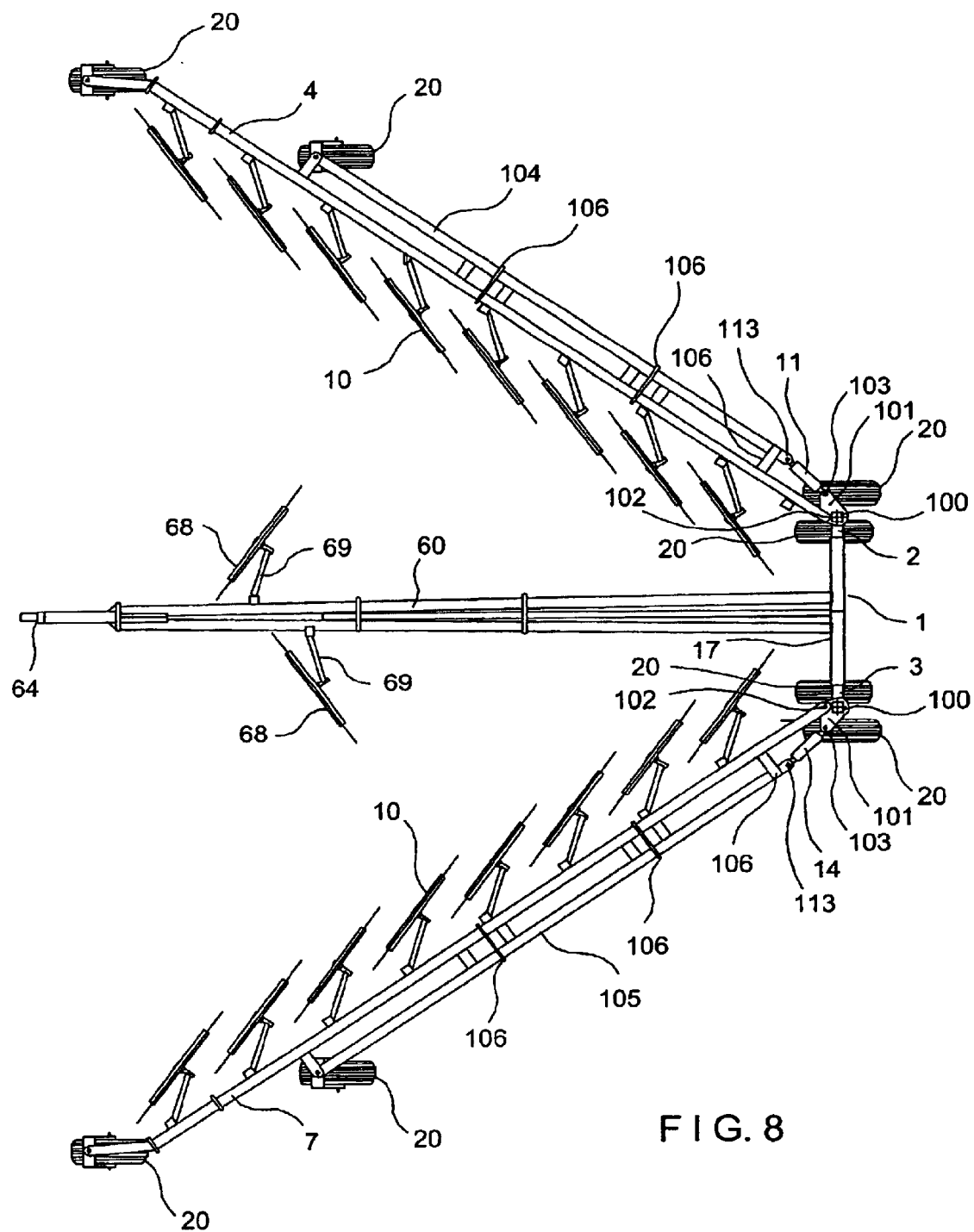
FIG. 8 shows a plan view of another embodiment of the towable hay rake according to another exemplary embodiment of the present invention.
Figure 8A:
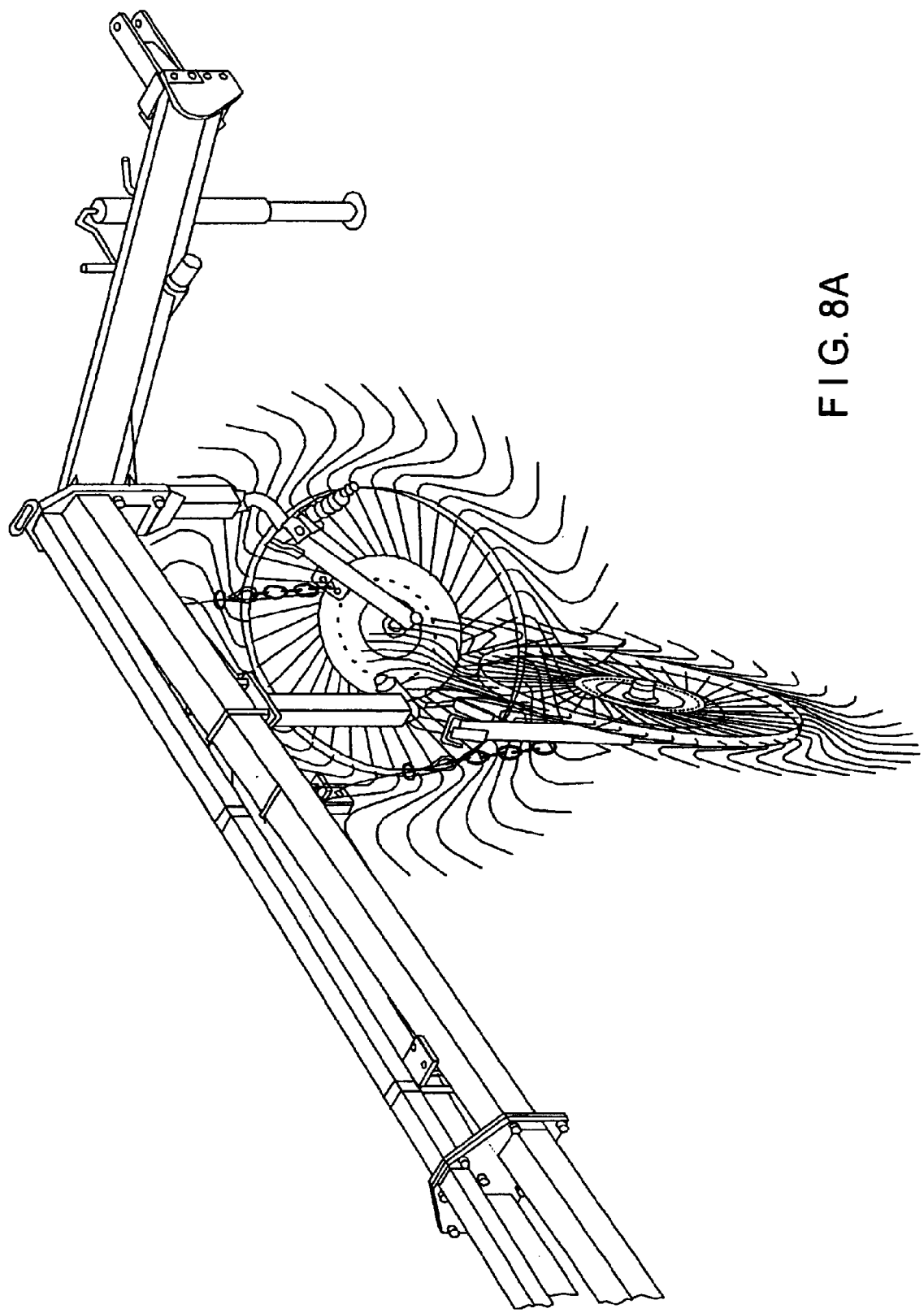
FIGS. 8A and 8B show the towable hay rake of FIG. 8 in an upper and a lower perspective view, respectively.
Figure 8B:
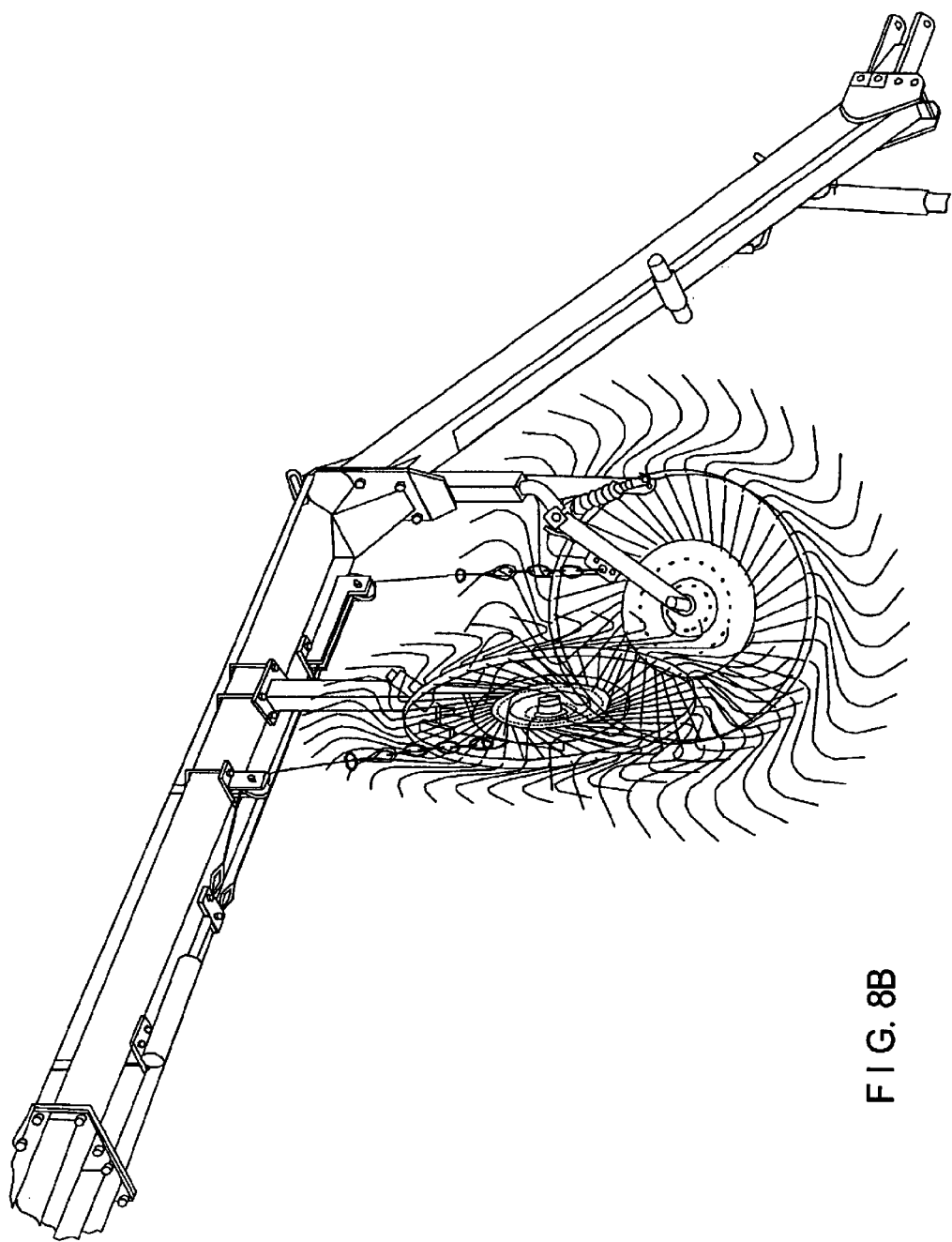

FIG. 8 shows a further exemplary embodiment of hay rake according to the present invention. FIG. 8 shows a towable hay rake essentially similar to the hay rake shown in FIG. 7 with the exception that additional haymaker wheels 68 are attached directly to the towing arm 60. In FIG. 8, there are provided two additional haymaker wheels 68, one on the left side of the towing arm 60 and one on the right side of the towing arm 60. The additional haymaker wheels 68 are attached to levers 69 that are swivel mounted to the towing arm 60 by means of joints such that they may be swivelled from an operating position, where they are extending from the towing arm 60, into a transport position, where they are abutted against the towing arm 60 such that the right and left rake arms 4 and 7 can be pivoted into positions close to the towing arm 60. This exemplary embodiment allows for a very efficient hay raking operation as well as for a small size of the hay rake, when the hay rake is transported from, for example, one field to another. In general, haymaker wheels 10 can be placed on right and left rake arms 4 and 7 facing the respective other rake arm 4 or 7, as shown in the drawings, or can be placed on the opposite side, facing away from the hay rake. In addition, the use of such additional hay making wheels can be employed on any of the types of towbars illustrated herein, as well as on the various parts of the stabilization arrangements illustrated herein. FIGS. 8A and 8B show the additional haymaking wheels 68 in an upper and a lower perspective view, respectively.

Figure 9:
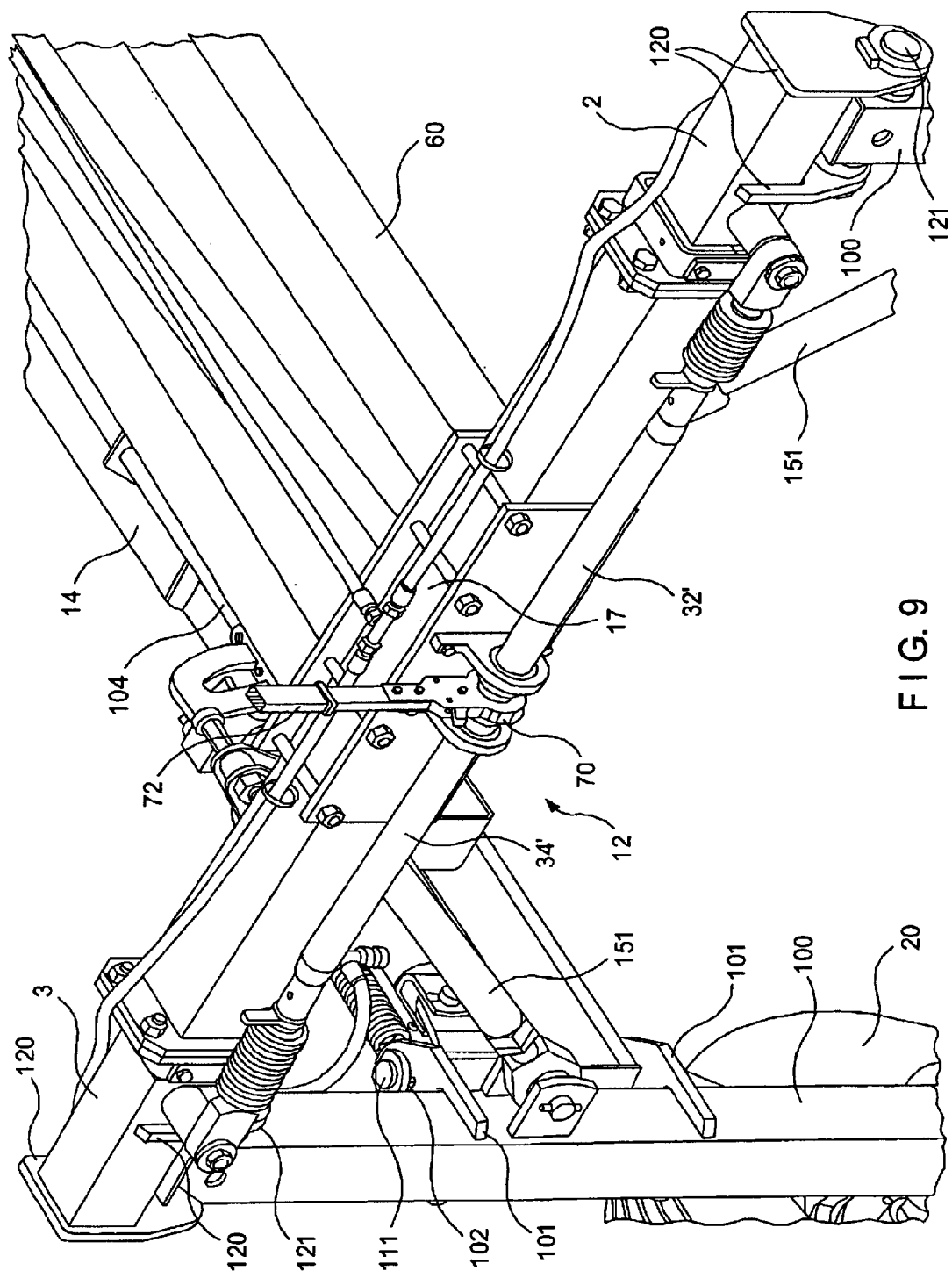
FIG. 9 shows a perspective rear view of an embodiment of the crossbar of the towable hay rake of the present invention.

FIG. 9 shows a further exemplary embodiment of the hay rake according to the present invention. In the exemplary embodiment shown in FIG. 9, crosswise member 1 is fitted with third and fourth actuators 32', 34' that are manually operated. In this exemplary embodiment, third and fourth actuators 32', 34' are dual action screw jacks connected to center section 17 at one end, and respectively to right and left sections 2 and 3 on the other end. In FIG. 9, both screw jacks 32', 34' are actuated by a ratchet mechanism 70 attached to center section 17, which is manually operated by the operator using lever 72. In an alternative of this embodiment, separate levers and ratchets may be used for each actuator 32', 34'.

Figure 10:
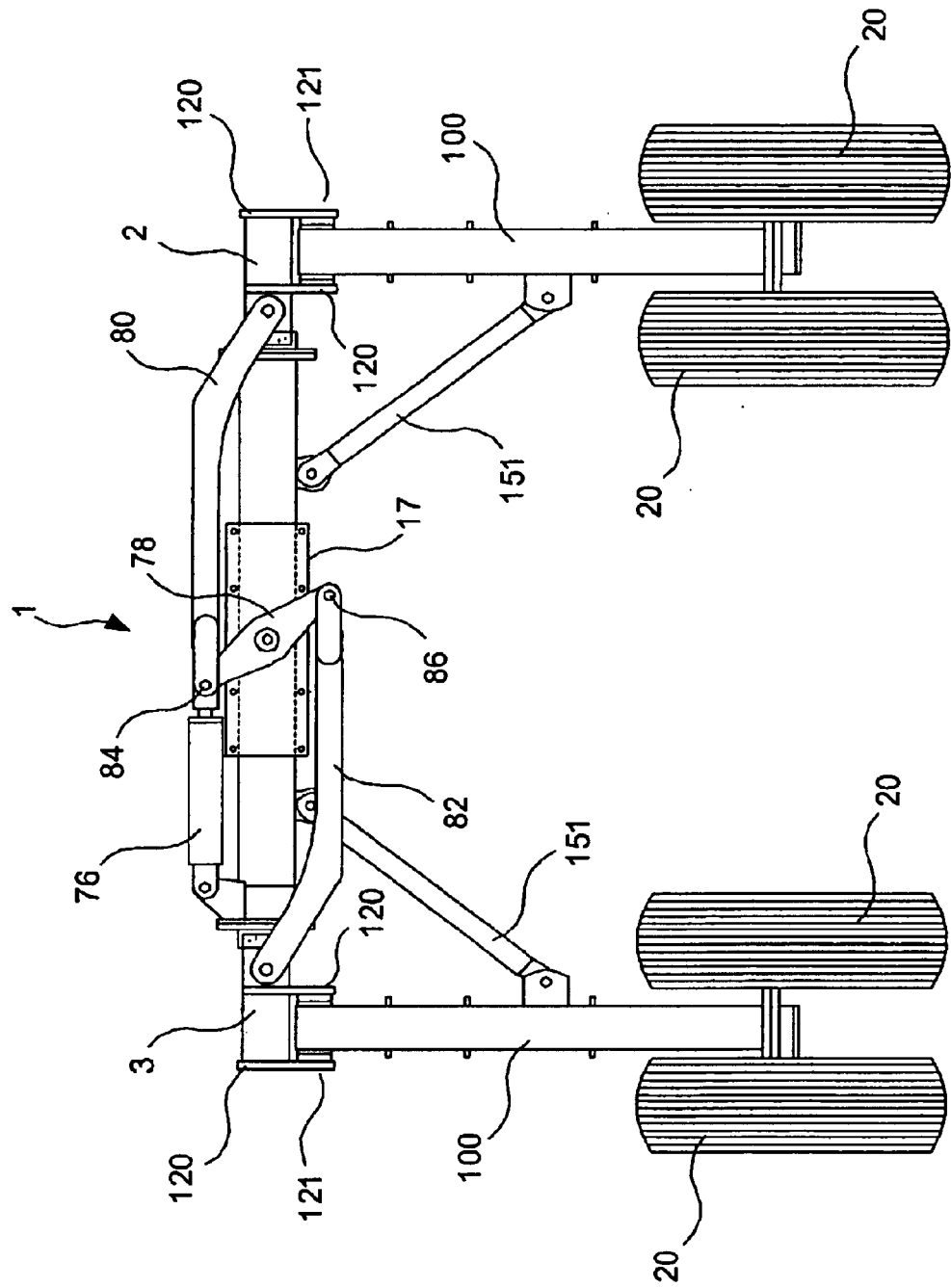
FIG. 10 shows a rear view of an embodiment of the wheeled crossbar of the hay rake of the present invention which is equipped with telescoping cylinders for lengthening and shortening the crossbar and is secured in the narrower position.
Figure 10A:
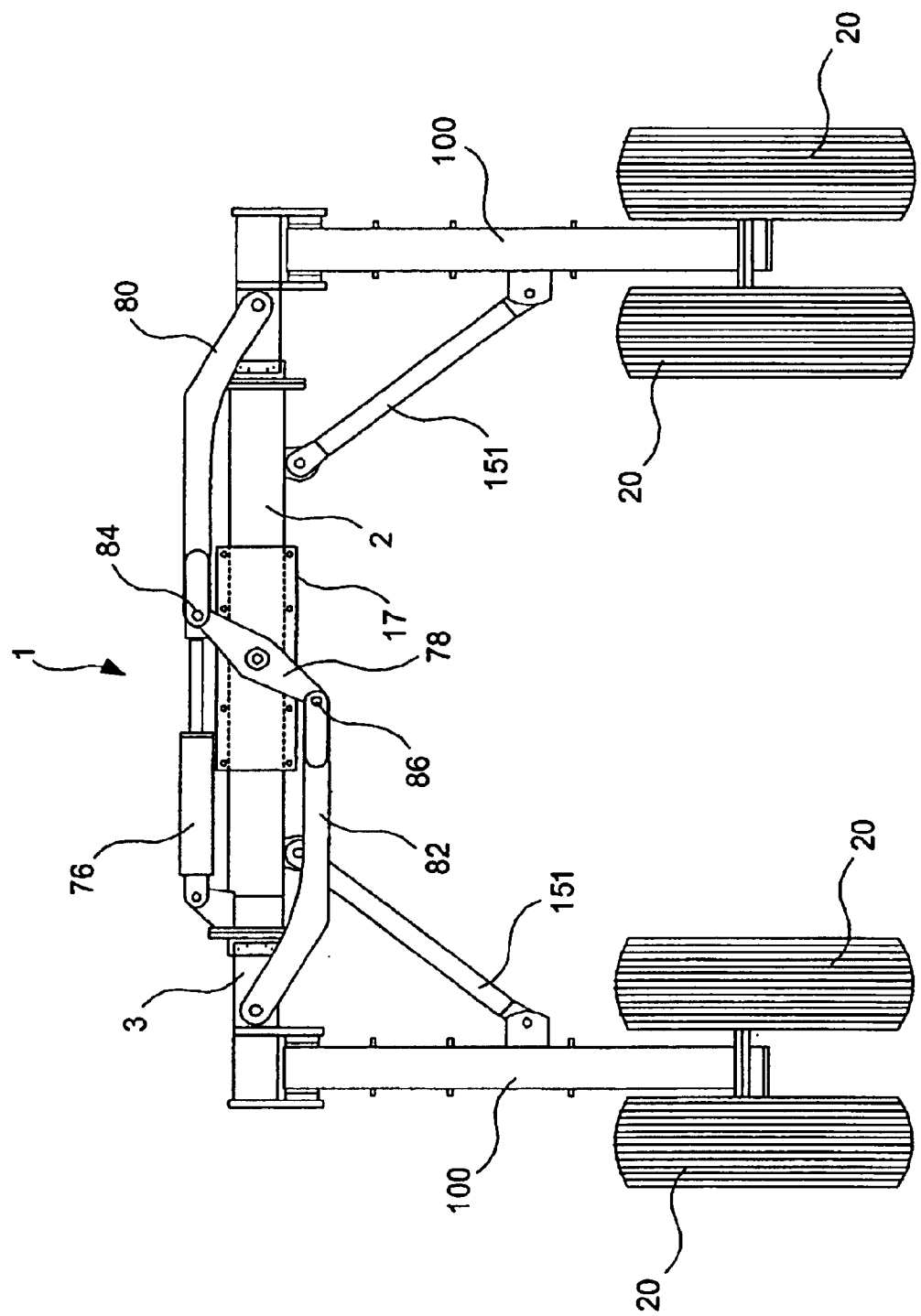
FIG. 10A shows a rear view of an embodiment of the wheeled crossbar of the hay rake shown in FIG. 10, where the telescoping cylinders for lengthening and shortening the crossbar is secured in the wider position.

FIGS. 10 and 10A show an exemplary embodiment of a mechanism for lengthening and shortening the crosswise member 1. The crosswise member 1 is shown in a closed configuration in FIG. 10, and in an open configuration in FIG. 10A. Right and left sections 2 and 3 of crosswise member 1 are slidably movable with respect to center section 17. In this exemplary embodiment, a fifth actuator 76 is attached at one end to center section 17. A balance arm 78 is pivotally attached to center section 17, and has one end 84 to which actuator 76 pivotally attaches. A first rod 80 is pivotally attached at one extremity to end 84 of balance arm 78, and at the other extremity to right section 2. Similarly, a second rod 82 is attached at one extremity to opposite end 86 of balance arm 78, and at the other extremity to left section 3. As seen in FIG. 10, operation of fifth actuator 76 causes both right and left sections 2 and 3 to slide in synchronous manner, thus opening or closing crosswise member 1. Furthermore, there are provided stabilizers 151 between the supports 100 and the crosswise member 1 allowing for an improved stability with respect to the torsion of the supports 100.

In an alternative of this embodiment, a similar configuration can be formed where a sixth actuator, similar to fifth actuator 76, attaches to end 86 of the balance arm 78. Also, both fifth and sixth actuators may be present. The fifth and sixth actuators may be dual action hydraulic cylinders, or may be manually operated screw jacks.

Figure 11:
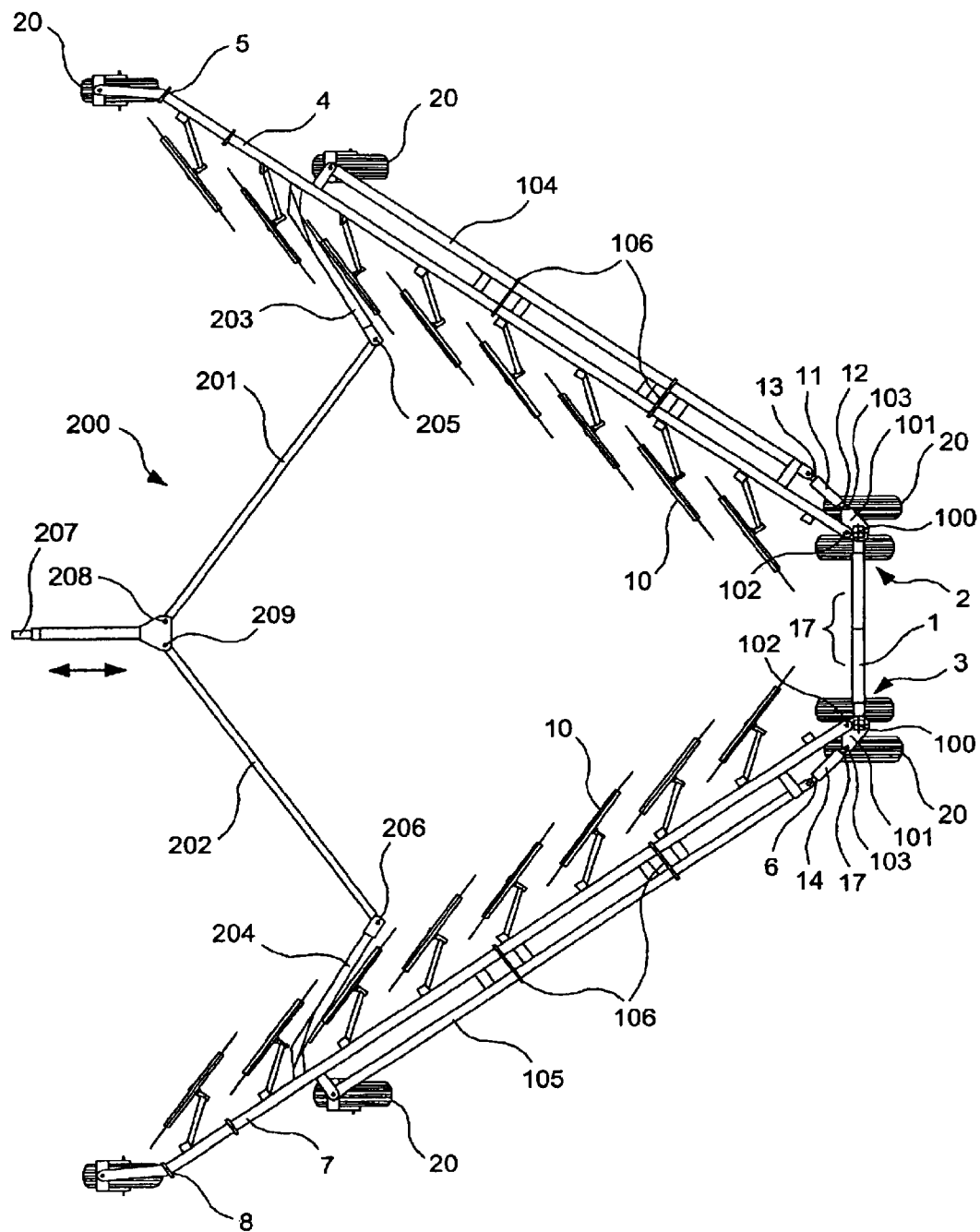
FIG. 11 shows a top plan view of another embodiment of the towable hay rake of the invention.

FIG. 11 shows a further exemplary embodiment of hay rake according to the present invention. FIG. 11 shows a towable hay rake essentially similar to the hay rake shown in FIG. 2 with the exception that there is provided a towing arrangement 200. The towing arrangement 200 includes a first beam 201 and a second beam 202, each having an inner and an outer end. The outer end of each of the first and second beams 201 and 202 is connected to appendages 203 and 204 via joints 205 and 206. The joints 205 and 206 allow a rotational movement of the beams 201 and 202 with respect to the appendages 203 and 204 The appendages 203 and 204 are connected to the first and second rake arms 4 and 7. The inner ends of the beams 201 and 202 are connected to a towing vehicle connector 207. On the front side of the vehicle connector 207, there is provided a suitable connecting means for connecting the hay rake to a vehicle, such as a towing eyelet. On the back side of the vehicle connector, there are provided two joints 208 and 209 connecting the beams 201 and 202 to the vehicle connector 207. When the first and second rake arms 4 and 7 are moved from the open position to the closed position, due to the joints 205, 206, 208 and 209, the towing arrangement is folded into the closing "V" shape of the hay rake. To the contrary, when the first and second rake arms 4 and 7 are opened towards the open position, the towing arrangement is folded out such that a vehicle can be connected to the vehicle connector 207. This embodiment allows for a hay rake, that is very compact in the closed position.

Figure 12:
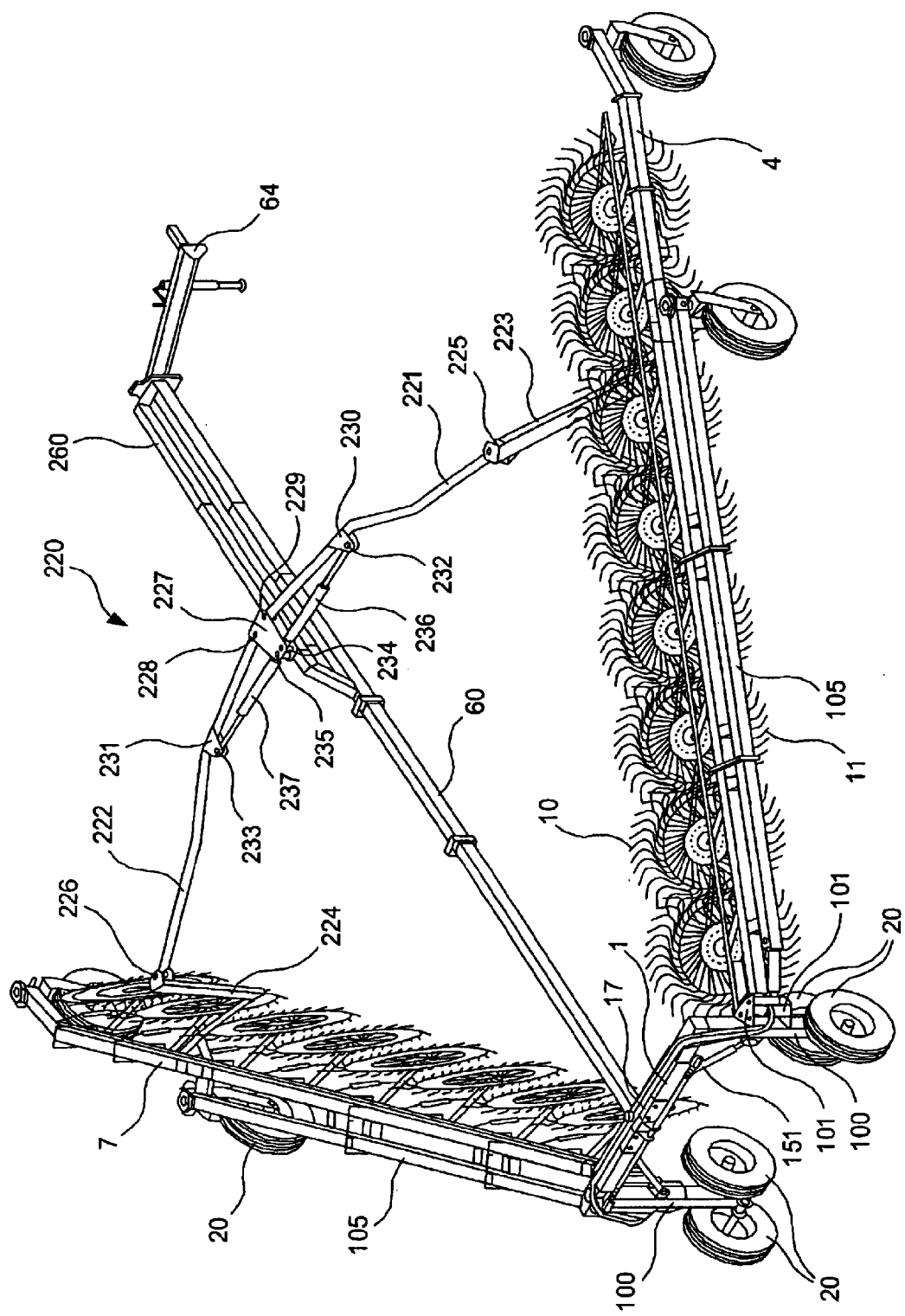
FIG. 12 shows a top perspective view of another embodiment of the towable hay rake of the present invention.

FIG. 12 shows a further exemplary embodiment of hay rake according to the present invention. FIG. 12 shows a towable hay rake essentially similar to the hay rake shown in FIG. 7 with the exception that there is provided a stabilizing arrangement 220. The stabilizing arrangement 220 includes beams 221 and 222 that are connected via appendages 223 and 224 to the first and second rake arms 4 and 7. The connection between the beams 221 and 222 and the appendages 223 and 224 is realized by means of joints 225 and 226 that allow a rotational movement of the beams 221 and 222 about the joints 225 and 226. Inner ends of the beams 221 and 222 are connected to a sliding plate 227 which is resting on a sliding section 260 on the towing arm 60. The beams 221 and 222 are connected to the sliding plate 227 by means of joints 228 and 229 that allow a rotational movement of the beams about the joints 228 and 229. The sliding section 260 is an elevated section of the towing arm 60 which is adapted to support the sliding plate 227. At middle sections 230 and 231 of the beams 221 and 222, there are provided further rotational joints 232 and 233. At a distance from the joints 228 and 229 on the sliding plate 227 in a direction toward the crosswise member 1, there are provided two further rotational joints 234 and 235 on the sliding plate 227. Between the joints 232 and 234 on one side, and between the joints 233 and 235 on the other side, there are provided dampers 236 and 237.

When the rake arms 4 and 7 are moved from the closed position towards the open position, the sliding plate 227 slides on the sliding section 260 of the towing arm 60 towards the crosswise member 1. As a result, the dampers 236 and 237 are expanded. When the rake arms 4 and 7 are moved from the open position towards the closed position, the sliding plate 227 slides on the sliding section 260 of the towing arm 60 in a direction away from the crosswise member 1. As a result, the dampers 236 and 237 are contracted. The dampers 236 and 237 are preferably two way dampers that have a damping action in the expanding direction and the contracting direction. This allows for a stable movement of the first and second rake arms between the open and closed position and for a stable hay rake.

Figure 13:
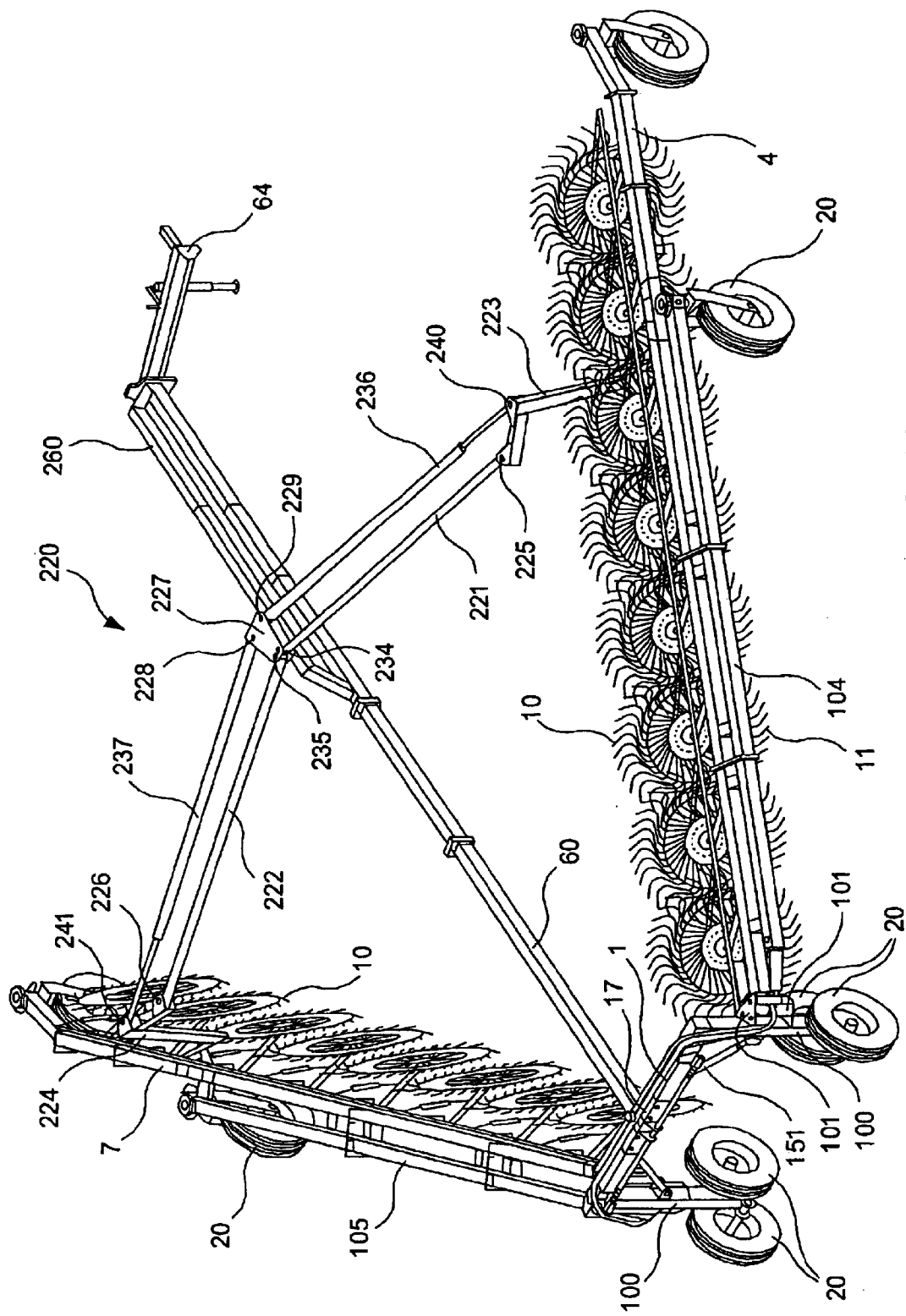
FIG. 13 shows a top perspective view of yet another embodiment of the towable hay rake of the present invention.

FIG. 13 shows a further exemplary embodiment of hay rake according to the present invention FIG. 13 shows a towable hay rake essentially similar to the hay rake shown in FIG. 12 with the exception that the beams 221 and 222 are connected to the joints 234 and 235 of the sliding plate 227 on the side of the sliding plate 227 facing the crosswise member 1. Furthermore, the damper 236 is connected to and between joint 229 of the sliding plate 227 and a joint 240 at the appendage 223 and the damper 237 is connected to and between joint 228 of the sliding plate 227 and a joint 241 at the appendage 224. This arrangement provides for a very stable hay rake.

Figure 14:
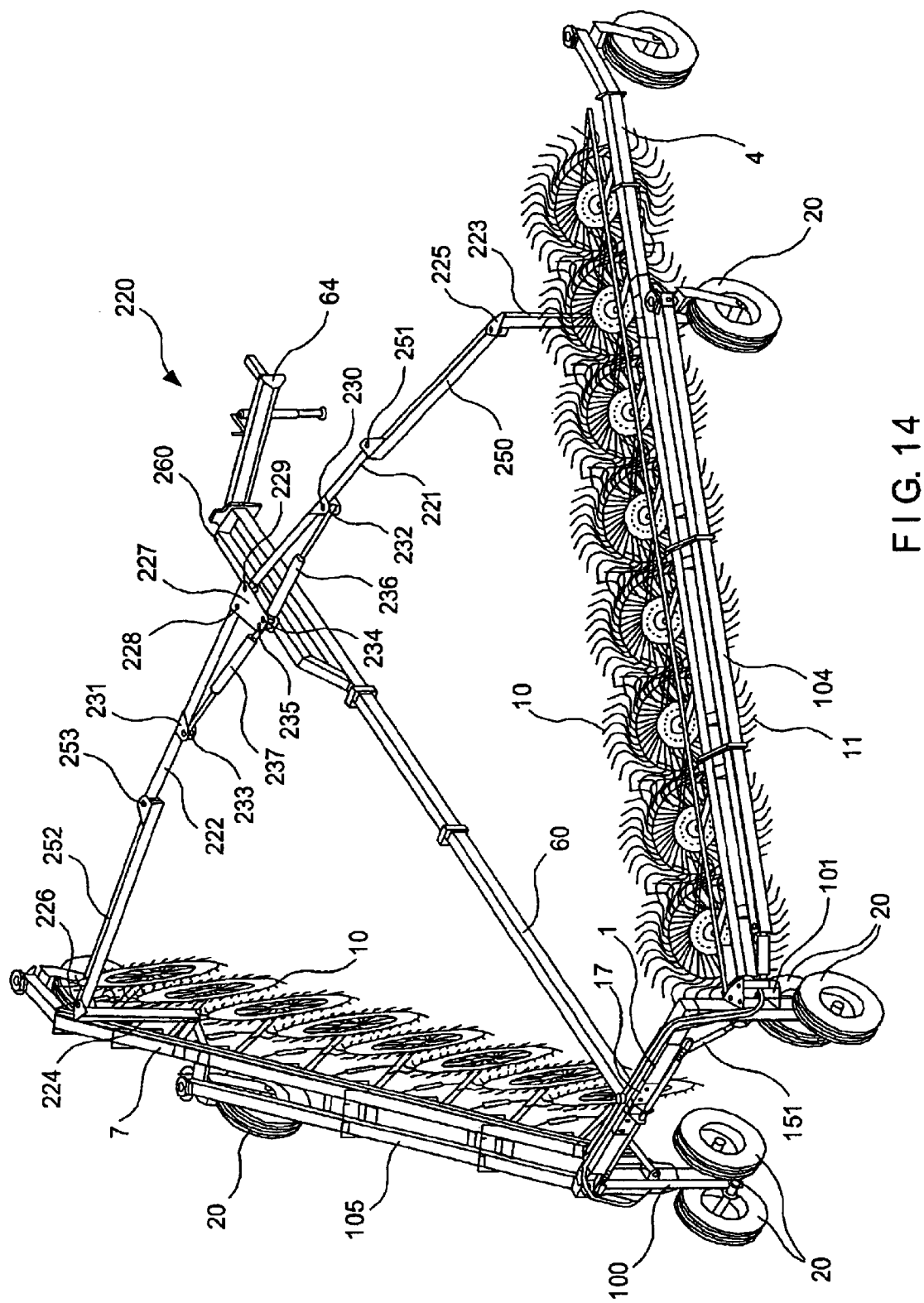
FIG. 14 shows a top perspective view of yet another embodiment of the towable hay rake of the present invention.

FIG. 14 shows a further exemplary embodiment of hay rake according to the present invention. FIG. 14 shows a towable hay rake essentially similar to the hay rake shown in FIG. 12 with the exception that the beams 221 and 222 are not connected directly to appendages 223 and 224 by means of joints 225 and 226. In FIG. 14, beam 221 is connected to one end of a further beam 250 by means of a rotational joint 251. Another end of the further beam 250 is connected to appendage 223 by the joint 225. Furthermore, in FIG. 14, beam 222 is connected to one end of a further beam 252 by means of a rotational joint 253. Another end of the further beam 252 is connected to appendage 224 by the joint 226.

Figure 15:
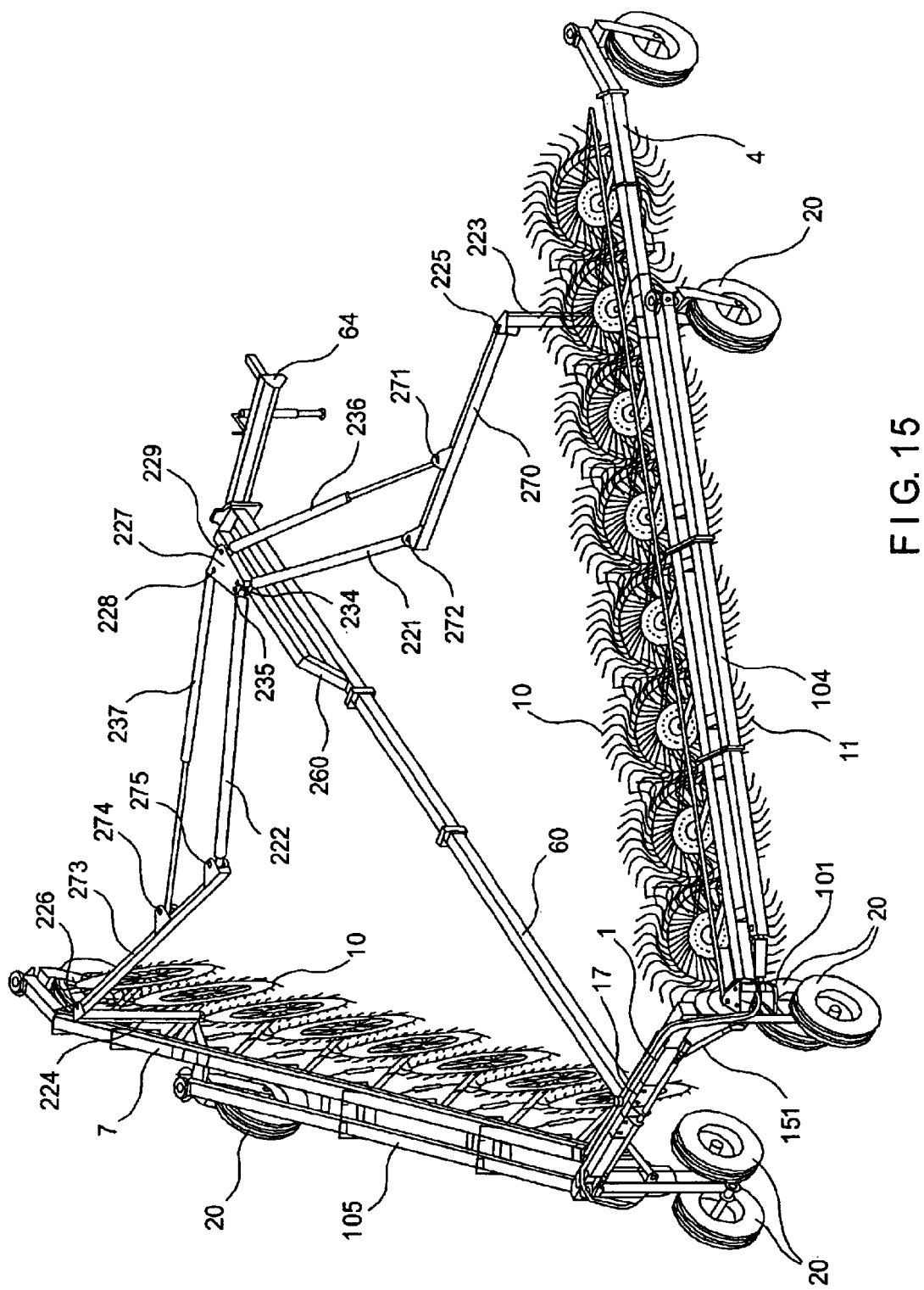
FIG. 15 shows a perspective view of yet another embodiment of the towable hay rake of the present invention.

FIG. 15 shows a further exemplary embodiment of the hay rake according to the present invention. FIG. 15 shows a towable hay rake essentially similar to the hay rake shown in FIG. 13 except that between the appendages 223 and 224, there are provided further beams 270 and 273. In detail, the damper 236 and the beam 221 are connected to the further beam 270 by means of rotational joints 271 and 272, respectively. The further beam 270 is connected to the appendage 223 via joint 225. Furthermore, the damper 237 and the beam 222 are connected to the further beam 273 by means of rotational joints 274 and 275, respectively. The further beam 273 is connected to the appendage 224 via joint 226.

Figure 16A:
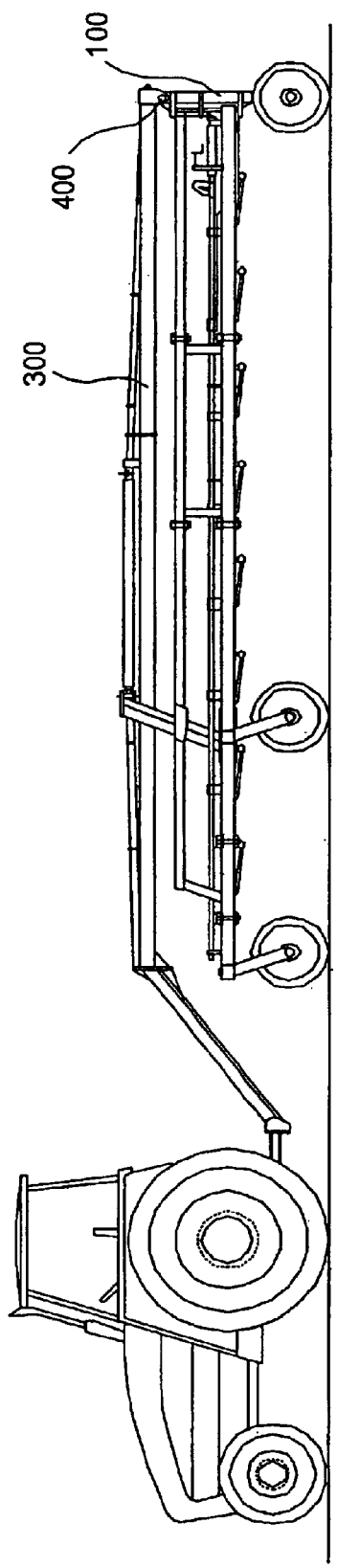
FIGS. 16A to 16C show side and rear views of yet another embodiment of the towable hay rake of the present invention.
Figure 16B:
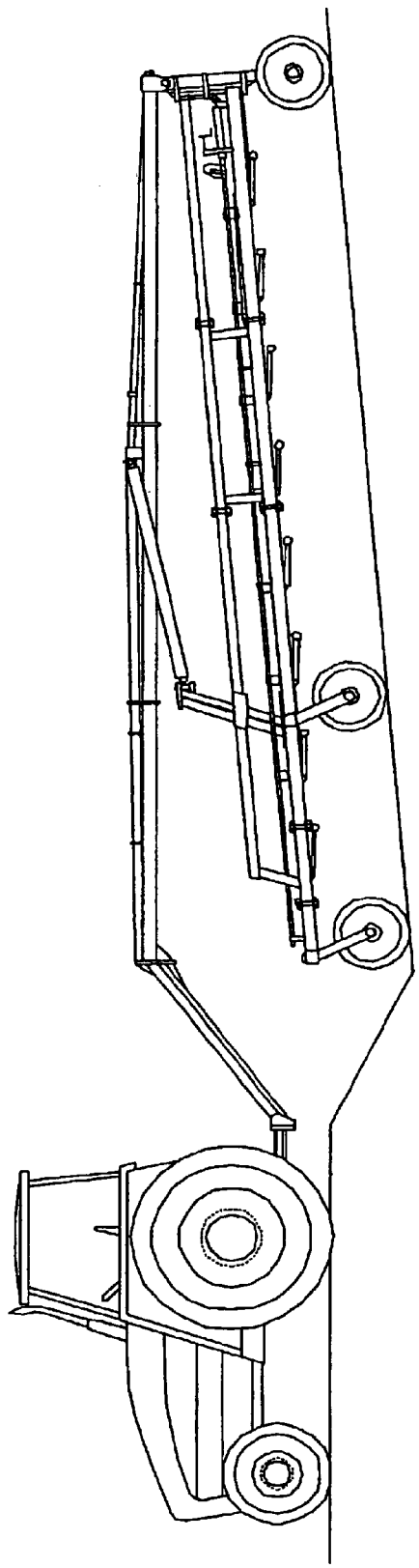
Figure 16C:
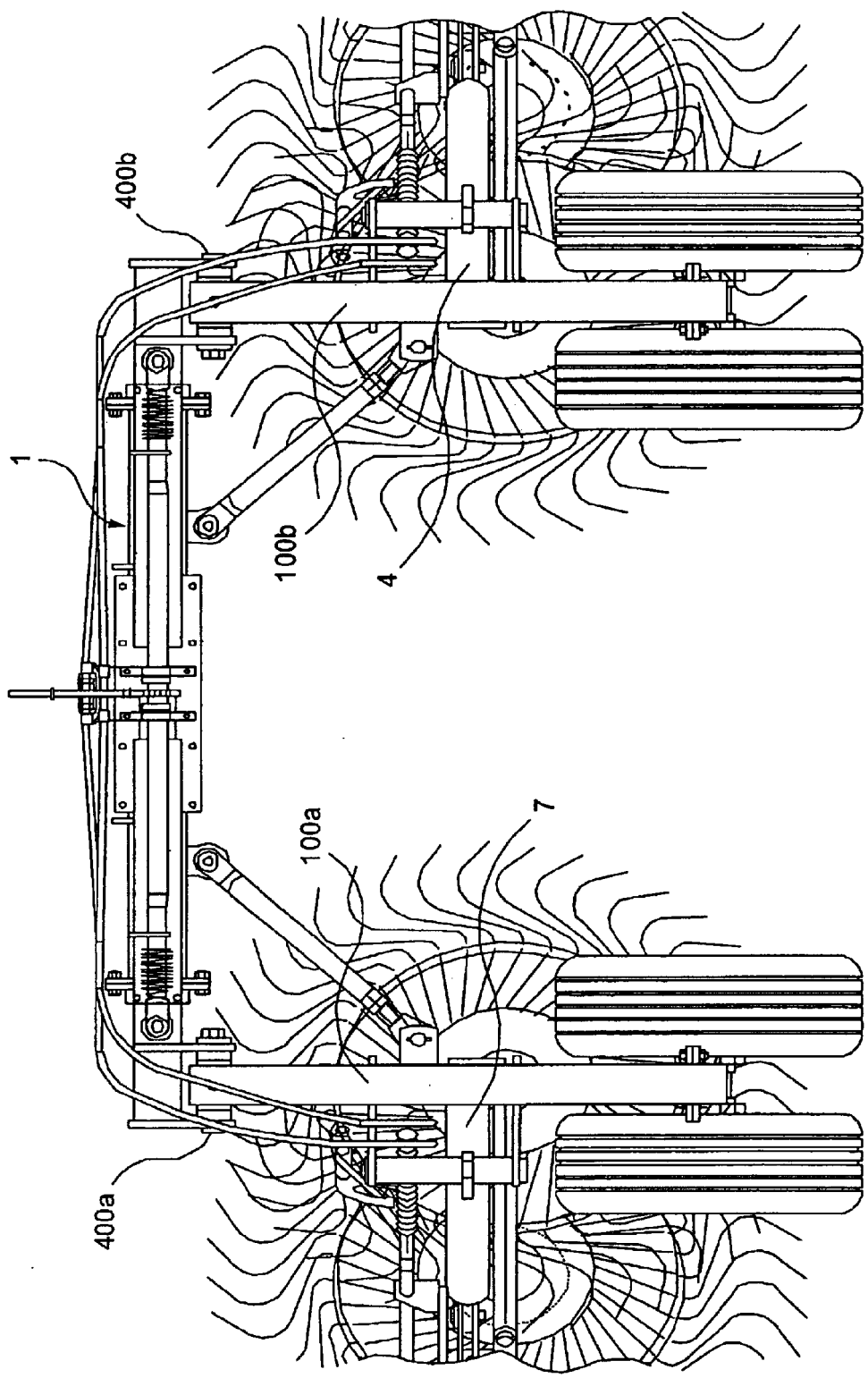

FIGS. 16A to 16C illustrate a hay rake in accordance with still another embodiment of the present invention. According to this embodiment, the hay rake is provided with a flexibility system that reduces the stress on the various components of the hay rake when the hay rake is operated on uneven terrain. For instance, FIG. 16A is a side view that illustrates the hay rake being pulled, on even terrain, by a tractor via the towbar 300. As shown in the figure, the hay rake further includes a rotatable connection 400 at the location where the hay rake arm, e.g., hay rake arm 4, connects to the crosswise member 1. On even terrain, the rotatable connection 400 enables the hay rake arm 4 to be connected to the crosswise member 1 such that the support 100 is substantially perpendicular to the towbar 300. FIG. 16C illustrates a first rotatable connection 400*a* rotatably connecting the crosswise member 1 to support 100*a* which supports hay rake arm 7, and a second rotatable connection 400*b* rotatably connecting the crosswise member 1 to support 100*b* which supports the hay rake arm 4. FIG. 16B is another side view that illustrates the hay rake being pulled by a tractor via the towbar 300, but in this figure, the hay rake is being pulled over uneven terrain. As shown in FIG. 16B, when the hay rake is pulled over uneven terrain, the rotatable connection 400 enables the supports 100 to rotate relative to the crosswise member 1. Thus, the support 100 is not maintained in a substantially perpendicular position relative to the towbar 300, but instead the hay rake arm 4 is permitted to be raised or lowered in accordance with the terrain. Because, in the embodiment shown in FIGS. 16A to 16C, each support 100*a* and 100*b* is rotatably mounted to the crosswise member 1 by respective rotatable connections 400*a* and 400*b*, the hay rake arms 4 and 7 are independently raised or lowered depending on the terrain. For instance, the rotatable connection 400*a* may enable the hay rake arm 7 to be lowered while simultaneously the rotatable connection 400*b* may enable the hay rake arm 4 to be raised, or vice versa.

It will be apparent to those skilled in the art that various modifications and variations can be made in the structure and the methodology of the present invention, without departing from the spirit or scope of the invention. Thus, it is intended that the present invention cover the modifications and variations of this invention provided they come within the scope of the appended claims and their equivalents.

What is claimed is:

1. A hay rake comprising:
    a crosswise member having a right section and a left section;
    a first rake arm having a front end and a back end, the first rake arm being pivotably mounted at its back end to the right section of the crosswise member so as to be moveable between an open position and a closed position;
    a second rake arm having a front end and a back end, the second rake arm being pivotably mounted at its back end to the left section of the crosswise member so as to be moveable between an open position and a closed position;
    a plurality of rotatable rake wheels mounted on each of the first and second rake arms; and
    first and a second actuators, the first actuator having a first section connected to the right section of the crosswise member and a second section connected to the first rake arm, and the second actuator having a first section connected to the left section of the crosswise member and a second section connected to the second rake arm, wherein each actuator is extendable so as to move the rake arm to which it is connected from the open position to the closed position and any position therebetween, and is retractable so as to move the rake arm to which it is connected from the closed position to the open position and any position therebetween,
    wherein: the crosswise member has a center section and the first rake arm is connected to the right section at a first point, the first point being at a first distance from the center section, the first section of the first actuator being connected to the right section at a second point, the second point being at a second distance from the center section, wherein the first distance is smaller then the second distance; and
    the second rake arm being connected to the left section at a third point, the third point being at a third distance from the center section, the first section of the second actuator being connected to the left section at a fourth point, the fourth point being at a fourth distance from the center section, wherein the third distance is smaller then the fourth distance.

2. The hay rake comprising:
    a crosswise member having a right section and a left section;
    a first rake arm having a front end and a back end, the first rake arm being pivotably mounted at its back end to the right section of the crosswise member so as to be moveable between an open position and a closed position;
    a second rake arm having a front end and a back end, the second rake arm being pivotably mounted at its back end to the left section of the crosswise member so as to be moveable between an open position and a closed position;
    a plurality of rotatable rake wheels mounted on each of the first and second rake arms; and
    first and a second actuators, the first actuator having a first section connected to the right section of the crosswise member and a second section connected to the first rake arm, and the second actuator having a first section connected to the left section of the crosswise member and a second section connected to the second rake arm, wherein each actuator operates to move the rake arm to which it is connected between the open position and the closed position;
    right and left sections of the crosswise member attached telescopically to respective opposite ends of a center section of the crosswise member, such that each of the right and left sections are movable between an extended and a retracted position;
    a third actuator connecting the center section of the crosswise member to the right section of the crosswise member; and
    a fourth actuator connecting the center section of the crosswise member to the left section of the crosswise member, wherein the third and fourth actuators move the right and left sections between the extended and the retracted positions.

3. The hay rake according to claim 2, further comprising:
    a balance arm having two ends, the balance arm being rotatably connected, to the center section of the crosswise member at a point substantially halfway between the right end and the left end of the center section, a first rod having an outer end and an inner end; and a second rod having an outer end and an inner end, wherein the inner end and the outer end of the first rod are rotatably connected to the first end of the balance arm and to the right section of the crosswise member, respectively, and wherein the inner end and outer end of the second rod are rotatably connected to the second end of the balance arm and to the left section of the crosswise member, respectively.

4. The hay rake according to claim 3, further comprising a fifth actuator having a first section connected to the center section of the crosswise member and a second section connected to the first end of the balance arm and a sixth actuator having a first section connected to the center section of the crosswise member and a second section connected to the second end of the balance arm.

5. The hay rake according to claim 4, wherein the fifth and sixth actuators are selected from a group consisting of a manual dual-action screw jack and a dual action hydraulic cylinder.

6. A hay rake comprising:

a crosswise member having a right section and a left section;

a first rake arm having a front end and a back end, the first rake arm being pivotably mounted at its back end to the right section of the crosswise member so as to be moveable between an open position and a closed position;

a second rake arm having a front end and a back end, the second rake arm being pivotably mounted at its back end to the left section of the crosswise member so as to be moveable between an open position and a closed position;

a plurality of rotatable rake wheels mounted on each of the first and second rake arms; and first and a second actuators, the first actuator having a first section connected to the right section of the crosswise member and a second section connected to the first rake arm, and the second actuator having a first section connected to the left section of the crosswise member and a second section connected to the second rake arm, wherein each actuator operates to move the rake arm to which it is connected horizontally between the open position and the closed position, wherein: the crosswise member has a center section and the first rake arm is connected to the right section at a first point, the first point being at a first distance from the center section, the first section of the first actuator being connected to the right section at a second point, the second point being at a second distance from the center section, wherein the first distance is smaller then the second distance; and the second rake arm being connected to the left section at a third point, the third point being at a third distance from the center section, the first section of the second actuator being connected to the left section at a fourth point, the fourth point being at a fourth distance from the center section, wherein the third distance is smaller then the fourth distance.

* * * * *